US012642189B2

(12) United States Patent
D'Amours et al.

(10) Patent No.: US 12,642,189 B2
(45) Date of Patent: Jun. 2, 2026

(54) BRUSH CUTTER ROTOR

(71) Applicant: 9422-8053 QUEBEC INC.,
Victoriaville (CA)

(72) Inventors: Luc D'Amours, Québec (CA);
Mahmood Akbari, Québec (CA)

(73) Assignee: 9422-8053 QUEBEC INC.,
Victoriaville (CA)

( * ) Notice: Subject to any disclaimer, the term of this
patent is extended or adjusted under 35
U.S.C. 154(b) by 437 days.

(21) Appl. No.: 18/034,308

(22) PCT Filed: Nov. 4, 2021

(86) PCT No.: PCT/CA2021/051573
§ 371 (c)(1),
(2) Date: Apr. 27, 2023

(87) PCT Pub. No.: WO2022/094715
PCT Pub. Date: May 12, 2022

(65) Prior Publication Data
US 2023/0380343 A1 Nov. 30, 2023

Related U.S. Application Data

(60) Provisional application No. 63/109,621, filed on Nov.
4, 2020.

(51) Int. Cl.
A01G 3/00 (2006.01)
A01G 23/06 (2006.01)

(52) U.S. Cl.
CPC ........... A01G 3/002 (2013.01); A01G 23/067
(2013.01)

(58) Field of Classification Search
CPC ...... A01D 34/835; A01D 34/52; A01D 34/53;
A01G 23/00; A01G 23/067; A01G 3/002
See application file for complete search history.

(56) References Cited

U.S. PATENT DOCUMENTS

| 5,642,765 A | 7/1997 | Brown |
| 6,237,865 B1 | 5/2001 | Luttermann et al. |

(Continued)

FOREIGN PATENT DOCUMENTS

| DE | 19928034 A1 | 12/1999 |
| EP | 4056027 A1 | 9/2022 |
| WO | 2007104405 A1 | 9/2007 |

OTHER PUBLICATIONS 9422-8053 Quebec Inc., European Patent Application No. 21887958.
3, Extended European Search Report, Oct. 8, 2024.

(Continued)

*Primary Examiner* — Brad Harcourt
(74) *Attorney, Agent, or Firm* — Moore & Van Allen
PLLC; Jeffrey R. Gray

(57) ABSTRACT

A brush cutter rotor comprising cutting tooth assemblies
sequentially arranged along a longitudinal axis of the brush
cutter rotor, and azimuthally offset to make up intertwined
spirals of cutting tooth assemblies. The cutting tooth assem-
blies of immediately adjacent tracks are arranged to provide
for a longitudinal gap in-between, and separating blades are
provided within said longitudinal gap on each side of each
track comprising one of the cutting tooth assemblies. They
form a comb to separate incoming material to a center of the
corresponding one of the cutting teeth and away from side
edges thereof. The front space before the central portion of
cutting teeth is thereby free, exempt from a protective guard.
A wear plate can be used in the holding base of the cutting
tooth assemblies under each cutting tooth.

21 Claims, 18 Drawing Sheets

(56)     References Cited

U.S. PATENT DOCUMENTS

| | | | |
|---|---|---|---|
| 6,764,035 | B2 | 7/2004 | Denis et al. |
| 10,882,051 | B1 * | 1/2021 | Dougherty .............. B02C 18/18 |
| 2003/0222164 | A1 | 12/2003 | Denis et al. |
| 2007/0261763 | A1 | 11/2007 | Labbe |
| 2008/0172912 | A1 | 7/2008 | Denis |
| 2009/0008488 | A1 | 1/2009 | Willibald |
| 2010/0044487 | A1 * | 2/2010 | Labbe ................... B02C 18/146 |
| | | | 241/293 |
| 2011/0209797 | A1 | 9/2011 | Labb |
| 2012/0067188 | A1 | 3/2012 | Denis et al. |
| 2013/0099039 | A1 * | 4/2013 | Gaudreault ............. B02C 18/18 |
| | | | 241/291 |
| 2017/0106375 | A1 * | 4/2017 | Gaudreault .......... A01G 23/093 |
| 2017/0297032 | A1 | 10/2017 | Denis |

OTHER PUBLICATIONS

International Patent Application No. PCT/CA2021/051573, International Search Report, Jan. 25, 2022.
International Patent Application No. PCT/CA2021/051573, Written Opinion, Jan. 25, 2022.

* cited by examiner

221

226

220

256

259

258

251

250

8° – 15°

3" – 5"

4° – 8°

3°

Φ0.6" – 1"

0.09" – 0.15"

0.4" – 0.8"

1.0" – 1.5"

100° – 140°

0.3" – .05"

SECTION A-A

BRUSH CUTTER ROTOR

CROSS-REFERENCE TO RELATED APPLICATIONS

This application is a National Stage Patent Application (filed under 35 § U.S.C. 371) of PCT/CA2021/051573 filed Nov. 4, 2021, which, in turn claims the priority or benefit of U.S. provisional patent application 63/109,621, filed Nov. 4, 2020, the specification of each of which are hereby incorporated herein by reference in their entirety.

BACKGROUND

(a) Field

The subject matter disclosed generally relates to cutting tools for vegetation. More specifically, it relates a rotor for a brush cutter.

(b) Related Prior Art

There are brush cutters which are typically mounted on a truck or another machine to cut vegetal matter such as tree branches, tree trunks, tree stumps, large quantities of stems and leaves such as compact bushes, and similar materials that need to be cut in a similar manner.

There are already apparatuses on the market, known as brush cutters, which have many drawbacks. In general, brush cutters are known to operate by having a rotor with a central cylinder onto which cutting teeth are mounted, and as the cylinder rotates, the cutting teeth are propelled onto the surface of the tree material onto which the apparatus is applied and enter in contact at high speed with the surface of the tree material. The task to be performed by this apparatus involves repeated impacts which use the cutting teeth and involve mechanical fatigue in different parts of the apparatus. This issue needs to be addressed.

SUMMARY

According to an aspect of the disclosure, there is provided a brush cutter rotor comprising:

a plurality of cutting teeth sequentially arranged along a longitudinal axis of the brush cutter rotor, and azimuthally offset from each adjacent one; and separating blades provided in a pair on each side of a corresponding one of the plurality of cutting teeth and which extend radially about the brush cutter rotor to separate incoming material to a center of the corresponding one of the plurality of cutting teeth and away from side edges thereof.

According to an embodiment, every second neighbor among the plurality of cutting teeth are arranged on the brush cutter rotor such that they together form a first spiral pattern, and every first neighbor of each of the plurality of cutting teeth of the first spiral pattern are arranged on the brush cutter rotor such that they together form a second spiral pattern substantially azimuthally opposed to the first spiral pattern.

According to an embodiment, each one of the plurality of cutting teeth is azimuthally offset from an adjacent one by 180° or 180° alternately, whereby each one of the plurality of cutting teeth is azimuthally offset from a second neighbor thereof by $\Delta\theta_{n,n+2}$, where $\Delta\theta_{n,n+2}$, is between 10° and 50°.

According to an embodiment, each separating blade is a disc portion which starts from an adjacent one of the corresponding one of the plurality of cutting teeth and azimuthally extends toward the corresponding one of the plurality of cutting teeth without reaching said corresponding one of the plurality of cutting teeth.

According to an embodiment, a portion of the disc portion which extends toward the corresponding one of the plurality of cutting teeth without reaching said corresponding one of the plurality of cutting teeth is incurved and forms a concavity which faces a cutting edge of the corresponding one of the plurality of cutting teeth.

According to an embodiment, each separating blade is a disc portion which starts from an adjacent one of the corresponding one of the plurality of cutting teeth and locally radially reaches a diameter D, and azimuthally extends along the brush cutter rotor while radially reaching less than the diameter D locally, and extends toward the corresponding one of the plurality of cutting teeth while radially reaching the diameter D again locally.

According to an embodiment, each separating blade azimuthally extends on an angular range $\Delta\theta_{tot}$ between about 90° and about 130°.

According to an embodiment, the separating blades are non-extremal blades, further comprising extremal blades at sides of the brush cutter rotor which each separating blade azimuthally extends on an angular range $\Delta\theta_{tot}$ between about 270° and about 310°.

According to an embodiment, a central portion of each cutting tooth assembly is facing a free space, exempt of any protecting guard extending there.

According to an embodiment, there are further provided cutting tooth assemblies installed on the cutter brush rotor, wherein each cutting tooth assembly comprises a holding base for receiving a corresponding cutting tooth therein.

According to an embodiment, the holding base for receiving a cutting tooth therein comprises a seat at a bottom of the holding base forming a corner, further comprising a wear plate to be installed in the corner of the seat, the cutting tooth being installed in the holding base over said wear plate, in contact with each other, the wear plate of a material different from a material of the cutting tooth.

According to an embodiment, cutting teeth are larger as they extend radially away from the brush cutter rotor and haves side edges thereof which each overlap along the longitudinal axis with a corresponding one of the separating blades.

According to another aspect of the disclosure, there is provided a brush cutter rotor comprising:

a plurality of tracks for cutting tooth assemblies sequentially arranged along a longitudinal axis of the brush cutter rotor, wherein cutting tooth assemblies of immediately adjacent tracks are arranged to provide for a longitudinal gap in-between; and separating blades provided along said longitudinal gap on each side of each track comprising one of the plurality of cutting tooth assemblies, and which extend radially about the brush cutter rotor to separate incoming material to a center of the corresponding one of the plurality of cutting tooth and away from side edges thereof.

According to an embodiment, a central portion of each cutting tooth assembly is facing a free space, exempt of any protecting guard extending there.

According to an embodiment, each cutting tooth assembly is arranged to be azimuthally offset from the cutting tooth assembly in the immediately adjacent tracks.

According to an embodiment, every second neighbor among the plurality of cutting tooth assemblies are arranged on the brush cutter rotor such that they together form a first spiral pattern, and every first neighbor of each of the plurality of cutting tooth assemblies of the first spiral pattern are arranged on the brush cutter rotor such that they together form a second spiral pattern substantially azimuthally opposed to the first spiral pattern.

According to an embodiment, each one of the plurality of cutting tooth assemblies is azimuthally offset from an adjacent one by 180° or $180°±\Delta\theta_{n,n+2}$ alternately, whereby each one of the plurality of cutting tooth assemblies is azimuthally offset from a second neighbor thereof by $\Delta\theta_{n,n+2}$, where $\Delta\theta_{n,n+2}$, is between 10° and 50°.

According to an embodiment, each separating blade is a disc portion which starts from the cutting tooth assembly in one of the immediately adjacent tracks and azimuthally extends toward the corresponding one of the plurality of cutting tooth assemblies without reaching said corresponding one of the plurality of cutting teeth.

According to an embodiment, a portion of the disc portion which extends toward the corresponding one of the plurality of cutting tooth assemblies without reaching said corresponding one of the plurality of cutting tooth assemblies is incurved and forms a concavity which faces a cutting edge of the corresponding one of the plurality of cutting tooth assemblies.

According to an embodiment, each separating blade is a disc portion which starts from an adjacent one of the corresponding one of the plurality of cutting tooth assemblies and locally radially reaches a diameter D, and azimuthally extends along the brush cutter rotor while radially reaching less than the diameter D locally, and extends toward the corresponding one of the plurality of cutting teeth while radially reaching the diameter D again locally.

According to an embodiment, each separating blade azimuthally extends on an angular range $\Delta\theta_{tot}$ between about 90° and about 130°.

According to an embodiment, the separating blades are non-extremal blades, further comprising extremal blades at sides of the brush cutter rotor which each separating blade azimuthally extends on an angular range $\Delta\theta_{tot}$ between about 270° and about 310°.

According to an embodiment, each cutting tooth assembly comprises a holding base for receiving a cutting tooth therein.

According to an embodiment, the holding base for receiving a cutting tooth therein comprises a seat at a bottom of the holding base forming a corner, further comprising a wear plate to be installed in the corner of the seat, the cutting tooth being installed in the holding base over said wear plate, in contact with each other.

According to an embodiment, wherein the cutting tooth and the wear plate is each distinctly screwed or bolted through the holding body with a distinct screw or bolt, respectively.

According to an embodiment, each cutting tooth is larger as it extends radially away from the brush cutter rotor and has side edges thereof which each overlap along the longitudinal axis with a corresponding one of the separating blades.

BRIEF DESCRIPTION OF THE DRAWINGS

Further features and advantages of the present disclosure will become apparent from the following detailed description, taken in combination with the appended drawings, in which:

FIG. 15-19 are a front bottom perspective view, a cross section, a front isometric view, a side isometric view and a rear isometric view, respectively, illustrating a cutting tooth, according to an embodiment of the invention;

It will be noted that throughout the appended drawings, like features are identified by like reference numerals.

DETAILED DESCRIPTION

There is described below a brush cutter rotor 10 which is used to cut vegetal matter such as tree branches, tree trunks, tree stumps, large quantities of stems and leaves such as compact bushes, and similar materials that need to be cut in a similar manner.

In general, there is a need to improve, i.e., to reduce the level of mechanical stress and wear in brush cutters, which the brush cutter rotor described herein seeks to address. More specifically, there are prior art apparatuses which use a protective guard in front of each of the cutting teeth (i.e., facing the cutting edge of the tooth) to reduce the force of impact on the teeth. However, we have found that doing this is problematic because the incoming material diverges from the center of the face (cutting edge) of the cutting tooth, and the incoming material hits the side edges of each cutting tooth instead. This results in premature wear of the apparatus, due to tear forces on the cutting teeth, repeated mechanical stress and vibrations due to repeated high forces on the sides of each cutting tooth at least partly due to the protective guard placed in front (facing) each cutting tooth.

According to an embodiment, and referring to FIGS. 1-7, the brush cutter rotor 10 comprises a cylinder 100 which is at the center of the apparatus. The cylinder 100 is a cylinder and it defines a longitudinal axis which is also the axis of rotation of the cylinder 100, around which it spins. The brush cutter is held by a mechanical arm of a truck or other similar machine, and the brush cutter rotor 10 is secured to the frame of the brush cutter and to the power transmission system of the truck or other similar machine using suitable mechanical and hydraulic elements. Using this configuration, the brush cutter rotor 10 is actuated to rotate, more specifically to spin about its own longitudinal axis. Cutting teeth are provided on the surface of the cylinder 100 to perform a cutting action on the incoming material to be acted upon, such as tree branches, tree trunks, tree stumps, large quantities of stems and leaves such as compact bushes, and similar materials that need to be cut in a similar manner.

Figure 21:
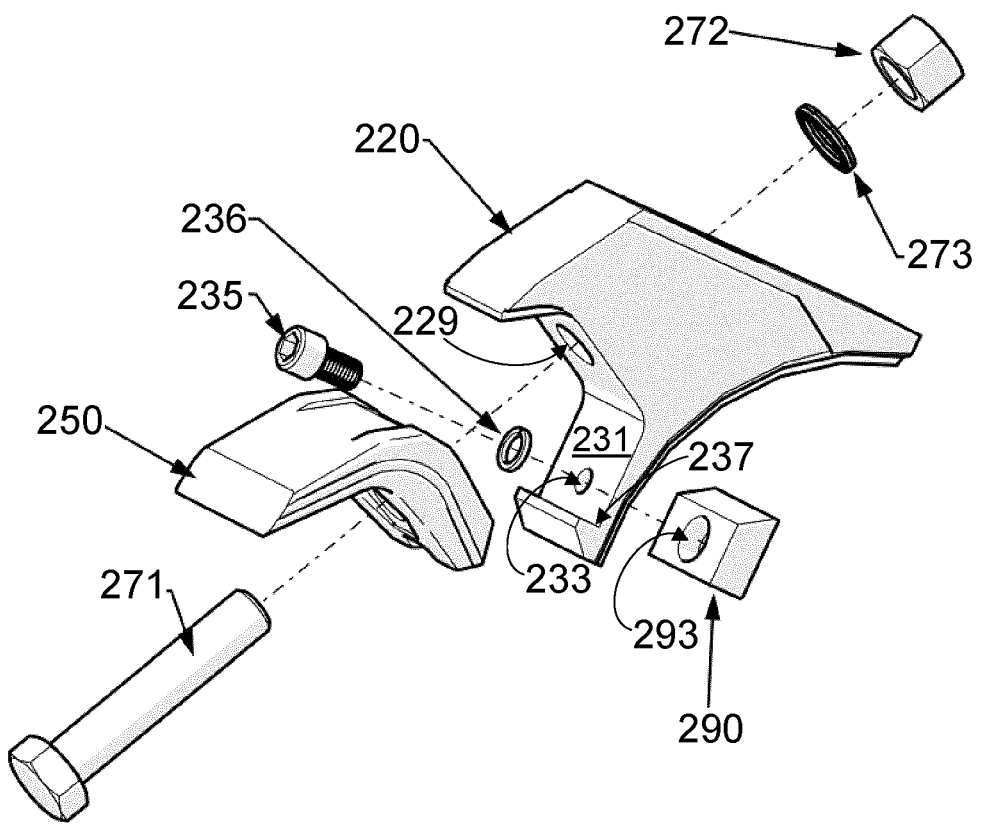
FIG. 21 is an exploded perspective view illustrating the cutting tooth, the wear plate and the holder, according to the embodiment of FIG. 20.

According to an embodiment, each cutting tooth 250 is a part of a cutting tooth assembly 200, since the cutting tooth 250 is not secured directly to the cylinder 100 (i.e., not in direct contact). More specifically, the cutting tooth assembly 200 comprises a holding base 220 (or holder base) acting as a holder for the cutting tooth 250, which is removable, and the cutting tooth 250 itself, which is removably mounted thereon. To secure the cutting tooth 250 on its base 220 for the base 220 to act as a holder, the cutting tooth 250 can be bolted using a screw 271 or threaded pin and a nut 272 at the end, on the base 220. A ring or washer 273 can also be used, as shown in FIG. 21 which discloses a different embodiment of the disclosure, to protect the contact surfaces between the nut and the holder base 220. According to an embodiment, the ring or washer 273 is a lock washer, such as a Nord-Lock™ safety washer, and it is used to reduce the risk of having a loosened screw. This FIG. 21 also shows that the screw 271 can be mostly a non-threaded pin on most of its length, with the threaded portion only at the distal end and shown to have a threaded portion extend through the nut 272. The base 220 is fixedly secured onto the cylinder 100 at the proper location. The location of each base 220 follows the pattern described below.

The cutting teeth 250 (or more precisely, the cutting tooth assemblies 200) are located on consecutive longitudinal positions on the cylinder, i.e., each single cutting tooth 250 is located at a z position (longitudinal position) defined by the longitudinal axis of the cylinder 100. Each cutting tooth also have an azimuthal position, i.e., it is positioned at a given angular position on the surface of the cylinder. As well shown in FIG. 1, there is a small azimuthal offset ($\Delta\theta_{n,n+2}$) between a given cutting tooth and its second neighbor. The series of every second neighbor therefore extends along the surface of the cylinder as a spiral having a pitch $\Delta\theta_{n,n+2}$ which can be well seen in FIG. 1. The immediate neighbor (first adjacent neighbor) of a given cutting tooth is located approximately at an opposite azimuth position, more precisely at the azimuth of the current cutting tooth +180° (or −180°, or 180° plus or minus $\Delta\theta_{n,n+2}$, alternately. The cutting teeth 250 are therefore located at alternate azimuthal positions on the surface of the cylinder, with the overall result of having two alternate series of cutting teeth 250 (each series formed of every second neighbor) each of the intertwining series independently following its own spiral along the longitudinal axis of the cylinder 100, on the surface thereof, of a pitch both series being locally at approximately opposite azimuthal positions. According to an embodiment, this angular offset $\Delta\theta_{n,n+2}$ between second neighbors is between 10° and 50°, preferably between 20° and 40°, more preferably between 25° and 35°, for example about 30°.

While the embodiments are described with more details with the cutting tooth assemblies arranged as two intertwined series forming two intertwined spirals located opposed to each other (azimuthally opposed of 360°/2), it can be understood that they could be arranged as 3 intertwined spirals, each being azimuthally offset of 360°/3=120°, or 4 intertwined spirals, each being azimuthally offset of 360°/4=90°, or N intertwined spirals, each being azimuthally offset of 360°/N, as long as the width of cutting tooth assemblies in immediately adjacent tracks (i.e., longitudinal neighbors) are arranged to provide for a spcing or gap in the longitudinal direction in which separating blades can be installed, as described in greater detail below. Doing this would also reduce the angular coverage of the disc portion forming said separating blades, still as described in greater detail below.

Figure 7:
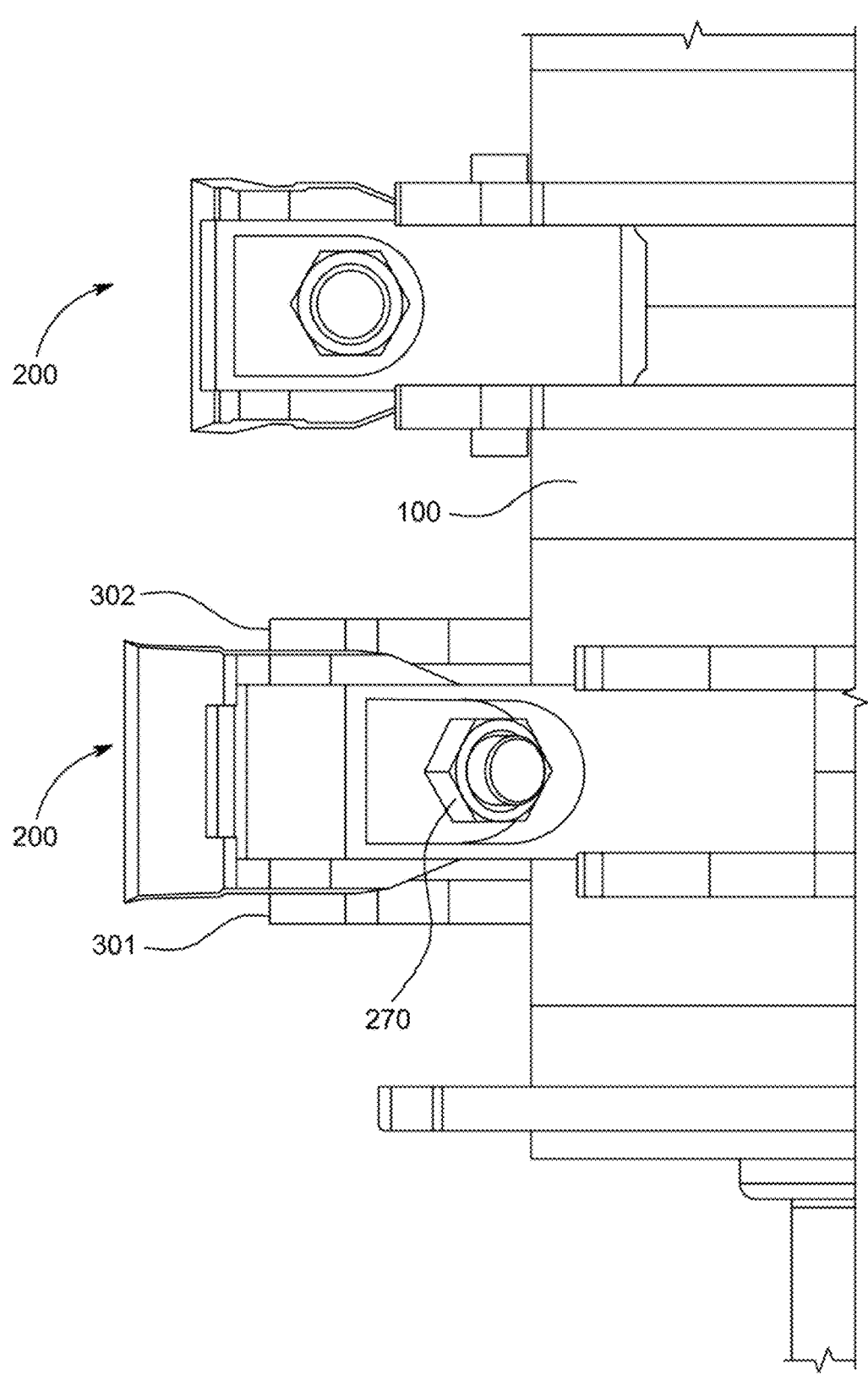
FIG. 7 is a close-up view illustrating the brush cutter rotor of FIG. 5 and more specifically illustrating a cutting tooth assembly on the brush cutter rotor, according to an embodiment of the invention.
Figure 8:
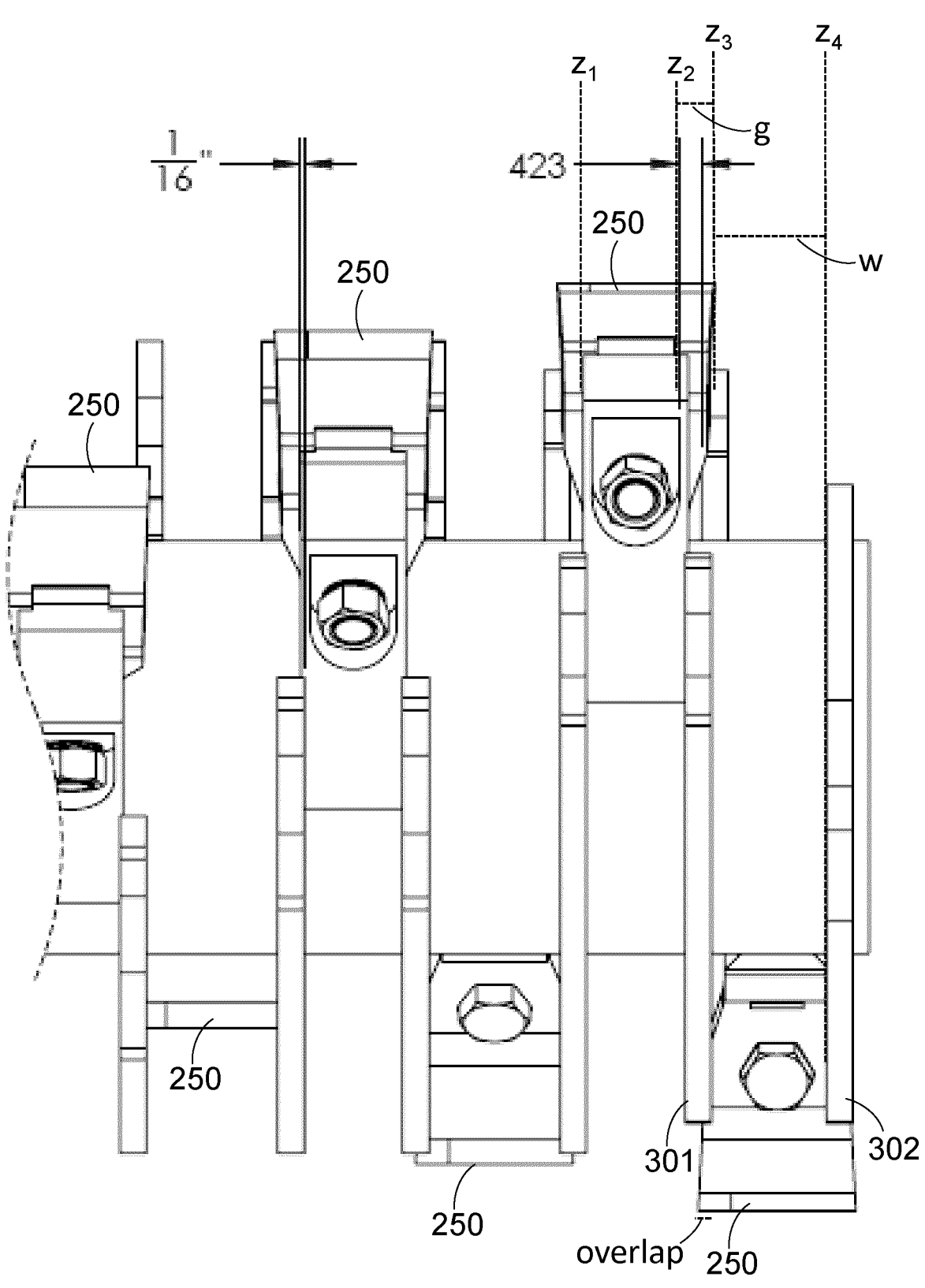
FIG. 8 is a top view illustrating a brush cutter rotor with disc portions acting as separating blades, according to an embodiment of the invention.

FIG. 7 also illustrates a cutting tooth assembly 200 and its second neighbor, with the azimuthal offset visible. The top view of FIG. 8 also shows the two intertwined series of cutting tooth assemblies 200, with the offset being illustrated between every second neighbor and the approximately opposite azimuthal location of the first neighbor of each cutting tooth assembly 200, which are all sequentially located one after the other along the longitudinal axis z of the cylinder 100. The longitudinal spacing between the position of adjacent cutting tooth assemblies 200 (each in its own track) is very small, i.e., right after a given cutting tooth assembly 200, the next one is located almost immediately after in the z-axis (while being nonetheless opposed in azimuthal position, i.e., they are neighbors when considering the longitudinal z-axis only). However, this spacing or gap is not zero, as there is provided, between each longitudinally-adjacent cutting tooth assembly 200 (each in its own track), a disc portion 300 acting as a separating blade to direct, unambiguously, any incoming material to be cut toward a specific one of the adjacent cutting tooth assemblies 200. As shown in FIG. 8, the disc portion 300 or separating blade occupies this spacing or gap. Formally: a given cutting tooth assembly longitudinally extends from $z_1$ to $z_2$, and the one in the immediately adjacent track longitudinally extends from $z_3$ to $z_4$. In this case, the width of the base of the cutting tooth assembly is $w=z_2-z_1=z_4-z_3$, and $z_3=z_2+g$ where g is the width of the gap. The disc portion 300 or separating blade longitudinally extends from $z_2$ to $z_3$, approximately, and the disc portion 300 or separating blade associated to a given cutting tooth assembly is typically held in place by the base of the cutting tooth assembly in the immediately adjacent track. Additional disc portions which are not formally between cutting tooth assemblies are provided at the extremities (ends) of the brush cutter rotor and secured there in a slightly different way as well shown in FIG. 4 (described in further detail below).

According to an exemplary embodiment of the disclosure, separating blades 300, also known as disc portions 300, described in greater detail further below, are provided in pairs, each pair being secured on each side of a corresponding cutting tooth 250. They separate the incoming material to make it converge directly onto the cutting tooth 250 or otherwise make it diverge away from a side edge of that cutting tooth, to be diverted away directly into the front (cutting edge 255) of the adjacent cutting tooth assembly 200. Doing this ensures that the side edges of each cutting tooth are not repeatedly submitted to tear forces and impacts by the incoming material, thanks to the separating blades or disc portions 300 being provided in alignment with said side edges. Each cutting tooth 250 receives incoming material from the front and the side edges are protected from the incoming material by the separating blades 300. Doing this reduces mechanical stress and fatigue on the cutting teeth and on other parts of the apparatus that would be subject to the resulting vibrations, which are now considerably reduced.

Figure 5:
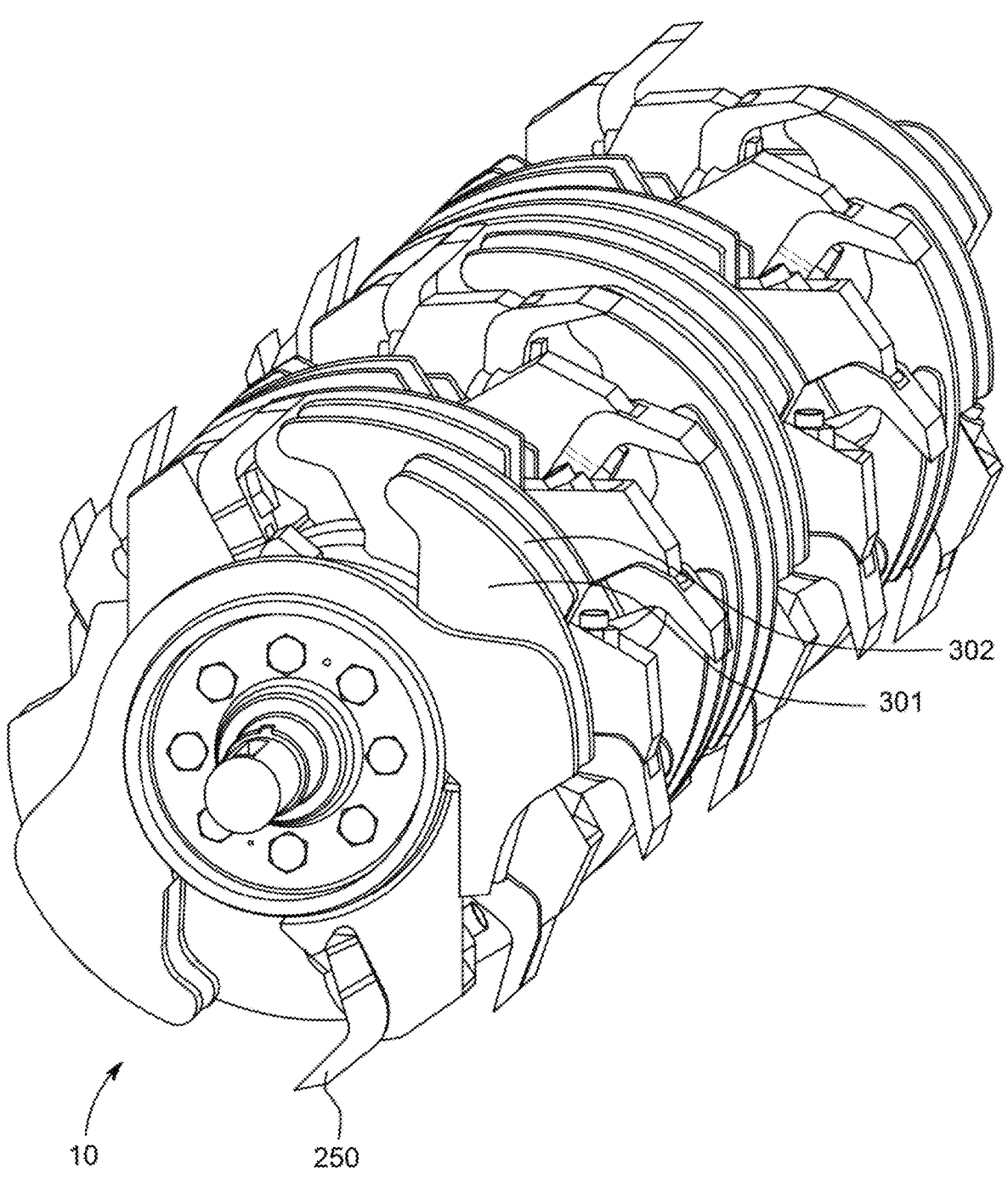
FIG. 5 is a front, left-side perspective view illustrating a brush cutter rotor, according to an embodiment of the invention.

According to an embodiment, the brush cutter rotor 10 comprises the separating blades or disc portions 300 arranged in pairs, where each pair is comprises a first disc portion 301 and a second disc portion 302, each on either side of a given cutting tooth assembly 200. The first disc portion 301 (on the left) and the second disc portion 302 (on the right) which, according to an embodiment, both correspond to a single corresponding cutting tooth assembly 200 are similar (although they may be of different angular lengths as discussed further below) and, as shown for example in FIG. 5, are parallel and spaced by a spacing which corresponds to the width of the single corresponding cutting tooth assembly 200 in between, and they are both arranged in the exact same way (i.e., same angular position when viewed from aside), which is angularly different (when viewed from aside) from the first disc portion 301 and the second disc portion 302 of the previous or of the second next cutting tooth assembly 200, with the offset $\Delta\theta_{n,n+2}$.

Figure 3:
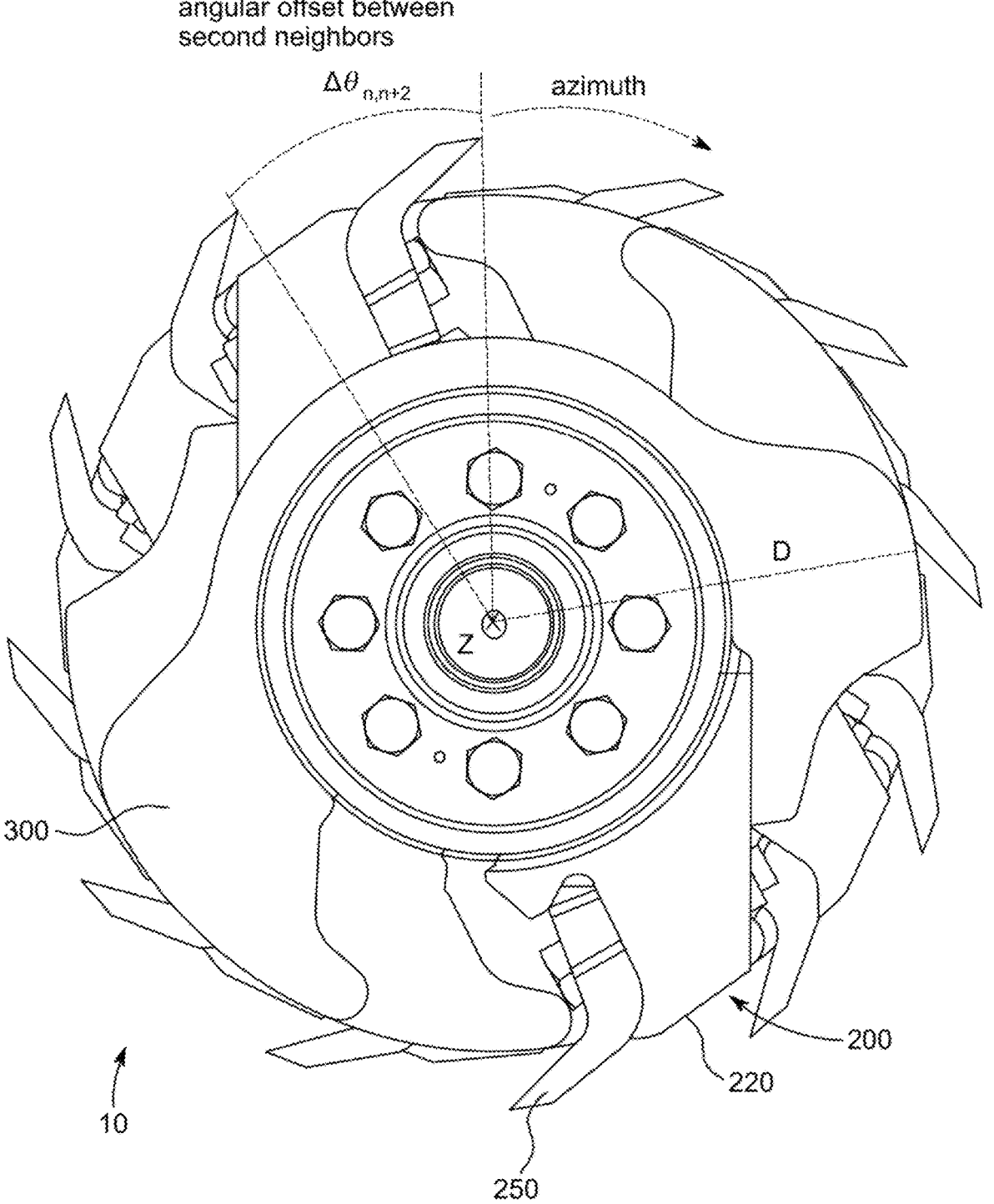
FIG. 3 is a side view illustrating a brush cutter rotor, according to an embodiment of the invention.
Figure 4:
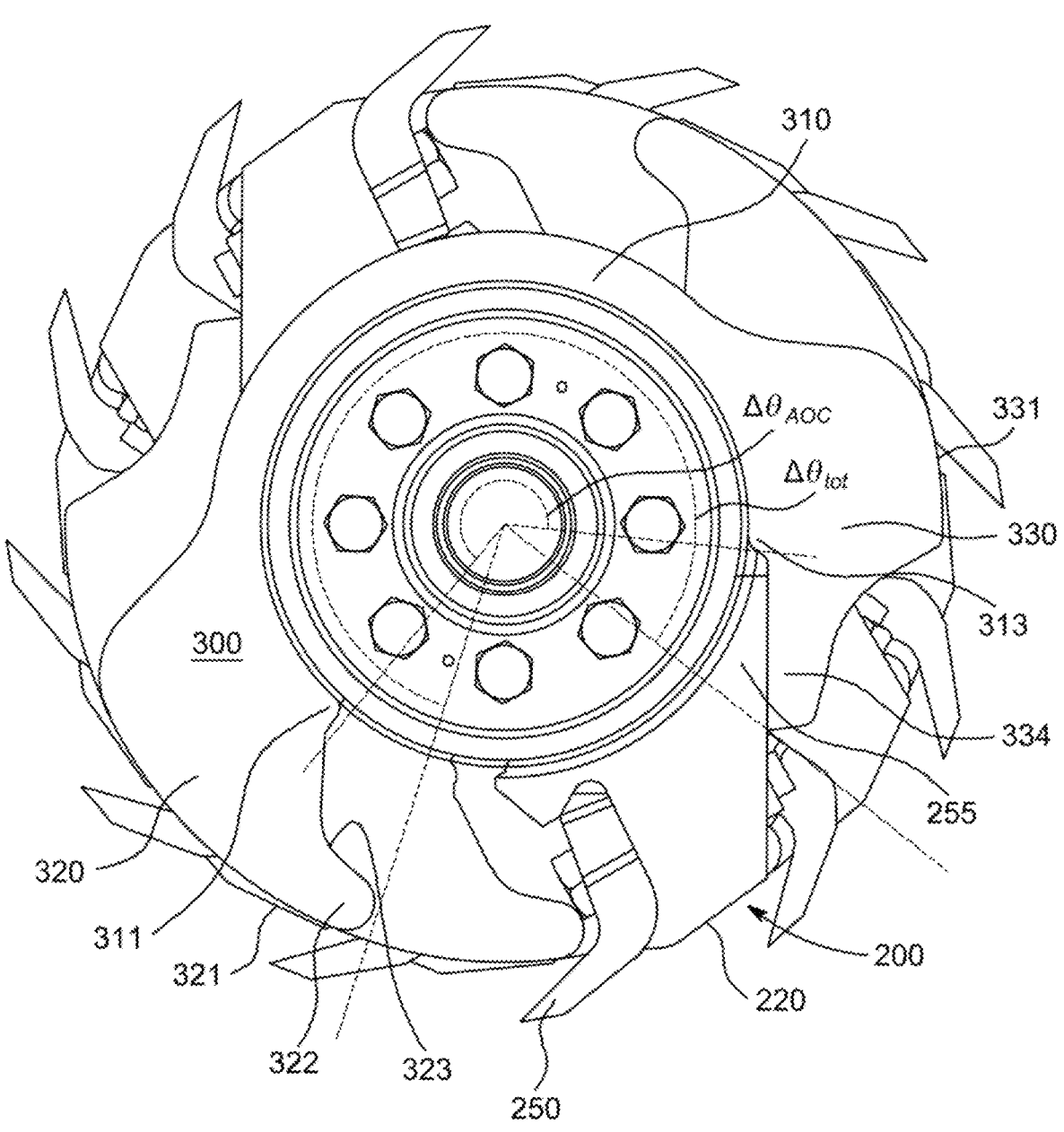
FIG. 4 is identical to FIG. 3, with the disc portion corresponding to a given cutting tooth assembly highlighted, with a preferred shape for the extremal (first or last) disc portion of the brush cutter rotor, according to an embodiment of the invention.
Figure 9:
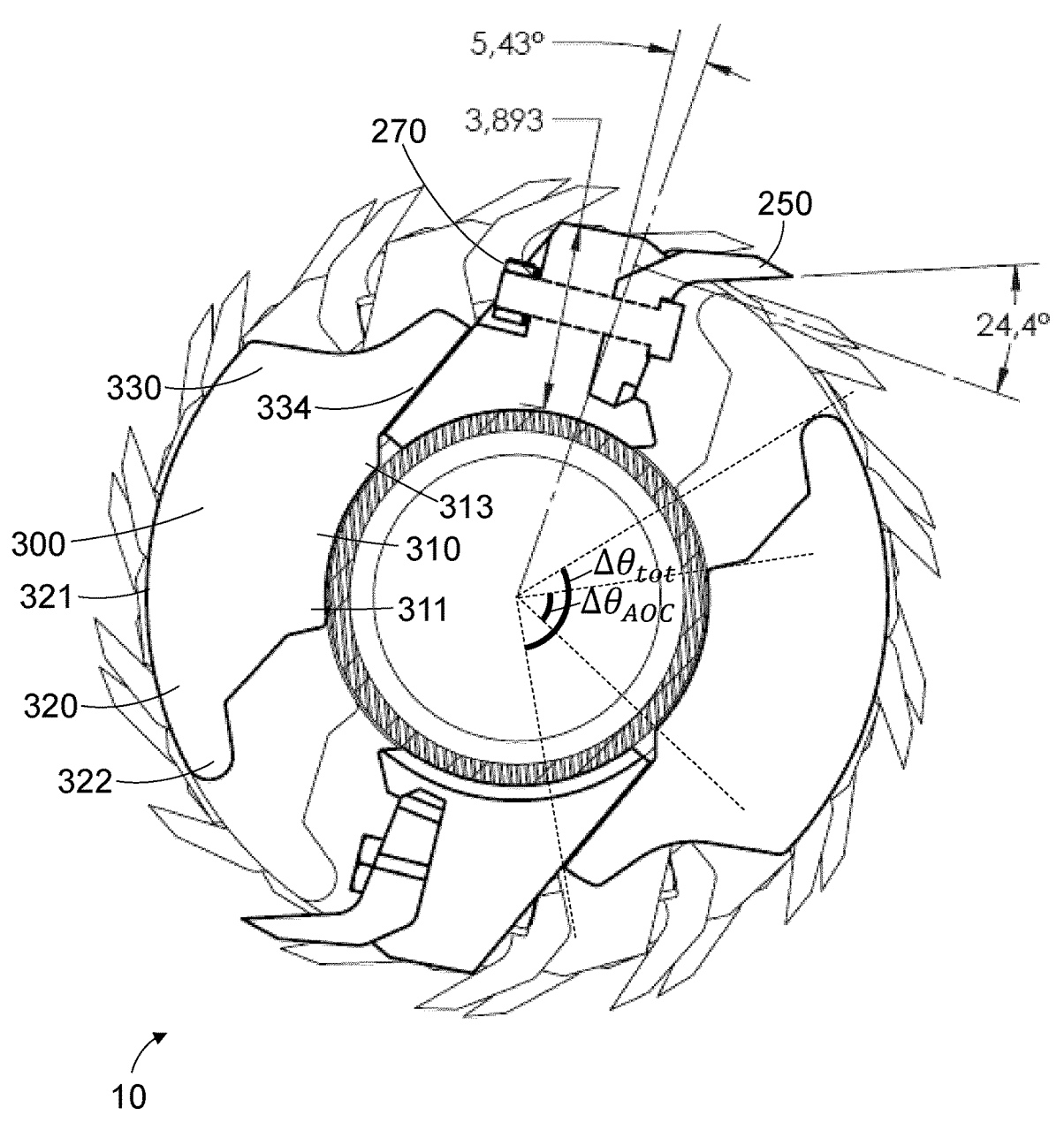
FIG. 9 is a top view illustrating a brush cutter rotor with disc portions acting as separating blades, according to an embodiment of the invention.
Figure 10:
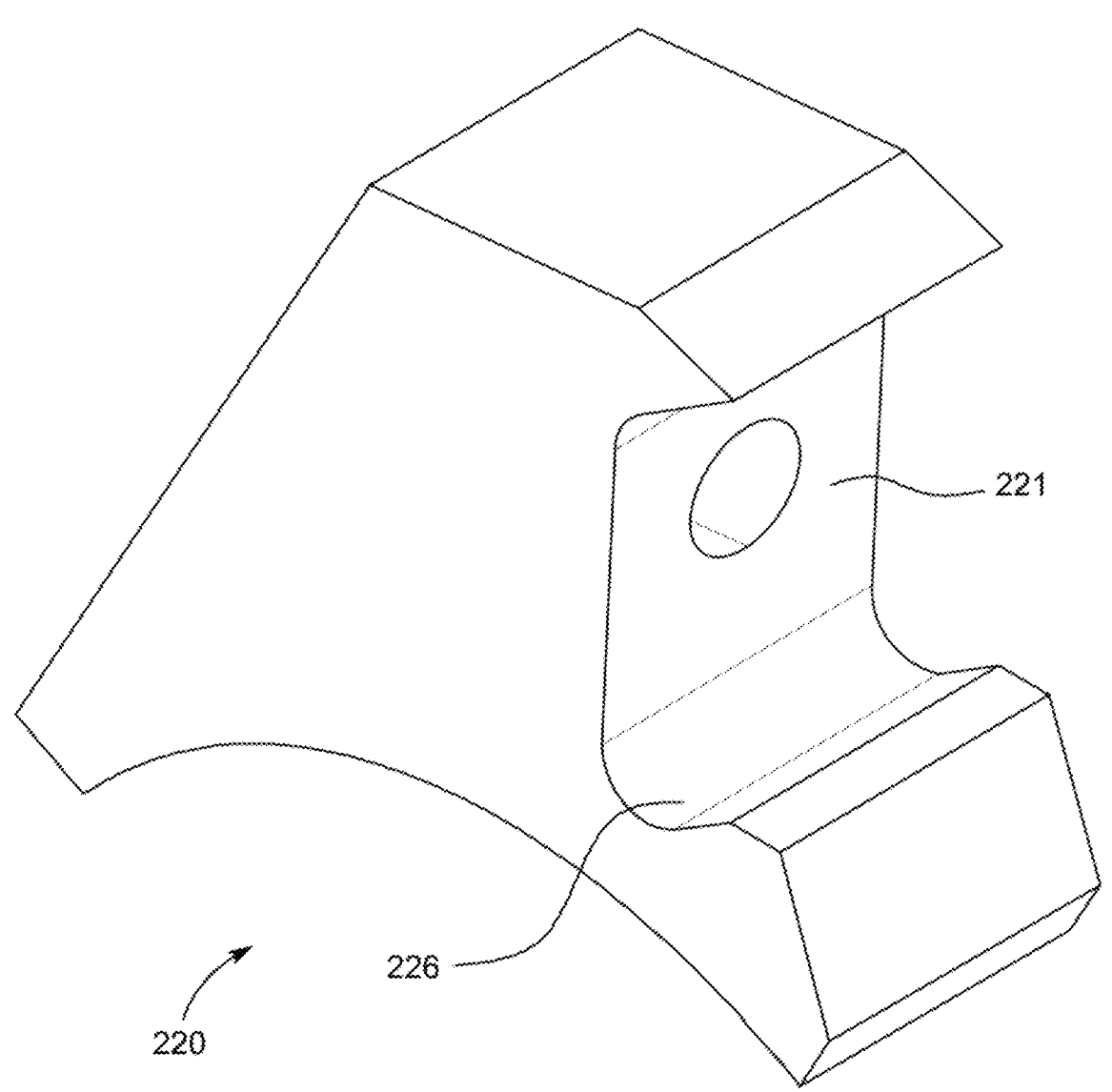
FIGS. 10-12 are two perspective views and a cross section illustrating a base acting as a holder for the cutting tooth, according to an embodiment of the invention.

Although the term "disc portion" is used, mainly because it can be manufactured by shaping a flat metal disc to arrive at the shape as shown in FIG. 4 or FIG. 9, it does not necessarily have the shape of a disc. For example, the pair of separating blades or disc portions (301, 302) can be viewed as a pair of winglets, or as spacing members which extend at either side of each cutting tooth assembly 200 to act as spacers, or as separators or separating blades, for the incoming material onto which the brush cutter rotor 10 is applied. However, the shape of a portion of a disc, with the outer edge thereof being an arc of a circle which is centered on the axial center of the brush cutter rotor 10, is useful to have the outer edge of said disc portions define an effective diameter for a toothless brush cutter rotor 10, which is also consistent with an outer edge of toothless cutting tooth assemblies 200, as well shown in FIGS. 3-5 and 9, where the diameter D is defined for the toothless cutting tooth assembly 200, with only the cutting teeth protruding when they are installed.

Figure 1:
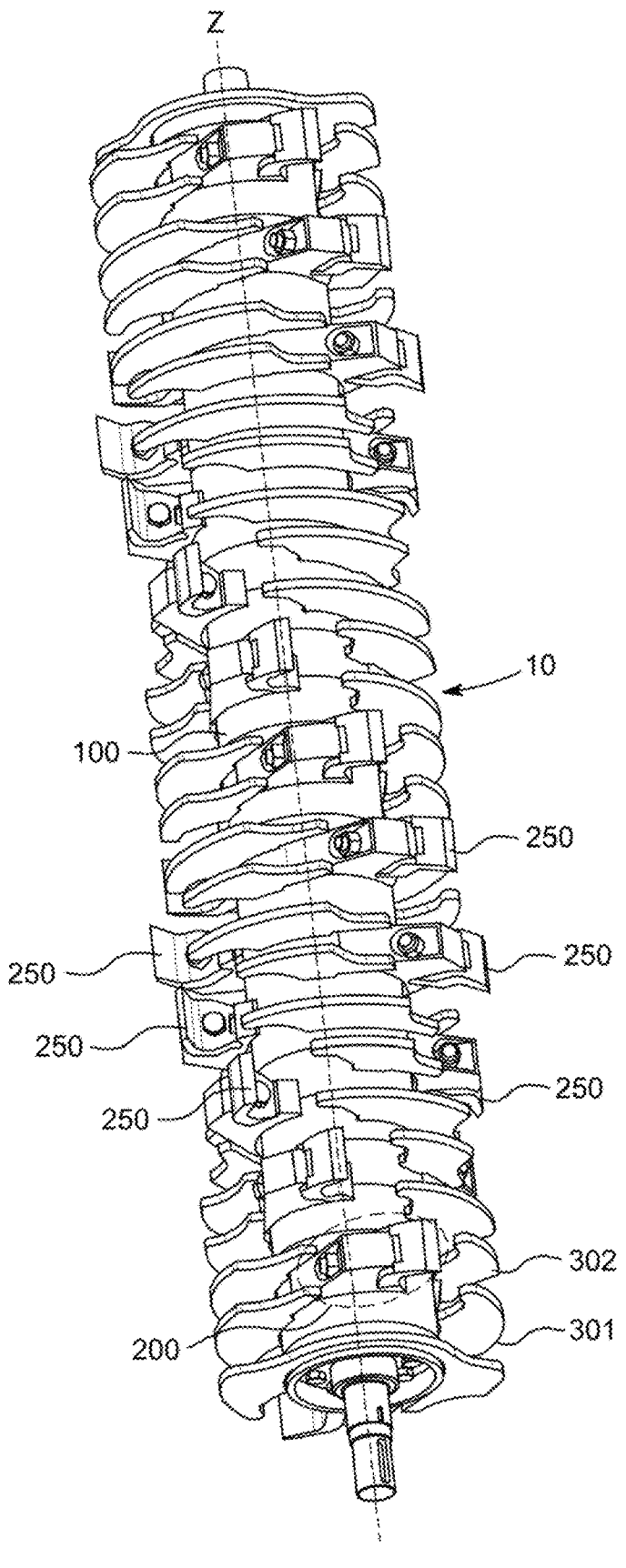
FIG. 1 is a front view illustrating a brush cutter rotor, according to an embodiment of the invention.
Figure 6:
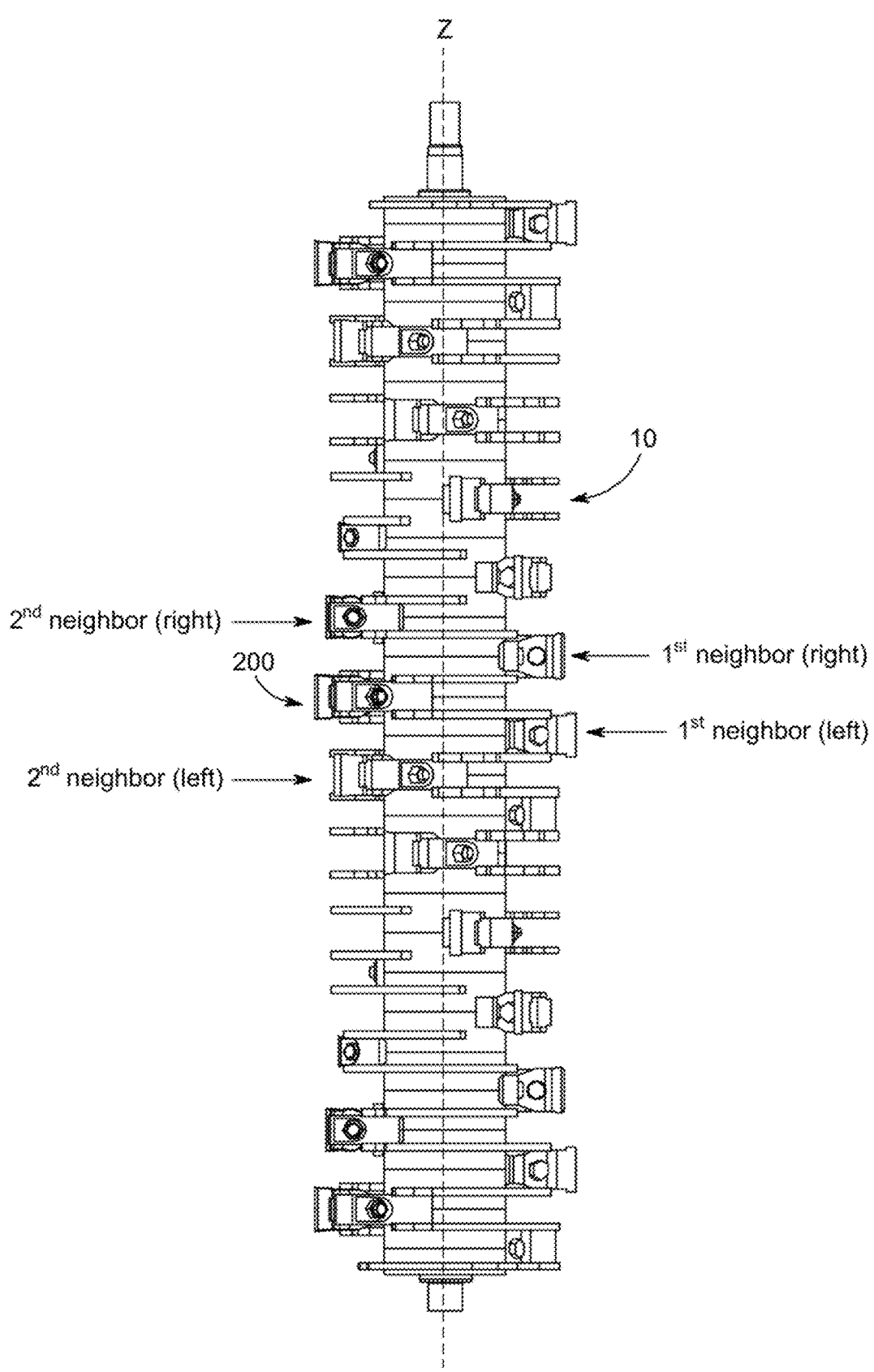
FIG. 6 is a top view illustrating a brush cutter rotor, according to an embodiment of the invention.

The disc portions 300 are not blades that cut material, rather blades upon which incoming material is forced to be distributed on one side (left or right) to separate the incoming material which will be impacted by a given cutting tooth 250 depending on the side of the separating blade into which it is engaged, as illustrated in FIG. 1, FIG. 6 or FIG. 8, for example.

Each disc portion 300 is made of a rigid material, such as steel or any other suitable metallic material. The disc portion 300 is flat, with a relatively small thickness (i.e., it is thin with respect to its own size).

The disc portion 300 which is one of the two which correspond to a given cutting tooth assembly 200 can be seated or supported either from the base 220 of that same cutting tooth assembly 200 and extend azimuthally around the cylinder over an angular coverage which is more than three quarters of a circle to have their tip being opposed to the cutting tooth 250 of that same cutting tooth assembly 200. This configuration is well shown in FIG. 4. Alternatively, and as best shown in FIG. 9, the disc portion 300 can be much shorter in length (i.e., angularly shorter of about 180°) by having the disc portion 300 which is one of the two which correspond to a given cutting tooth assembly 200 seated or supported either from the base 220 of the adjacent cutting tooth assembly 200 (first neighbor as shown in FIG.

6) and extend azimuthally around the cylinder over an angular coverage which is approximately one third of a circle to have their tip being opposed to the cutting tooth 250 of the corresponding cutting tooth assembly 200. According to an embodiment, most disc portions 300 have the second configuration (shown in FIG. 9) and the extremal disc portions 300 (first and last and both ends of the brush cutter rotor 10) have the first configuration shown in FIG. 4.

Now referring to the parts of the disc portion 300, shown with greater clarity in FIG. 4 but also applicable with respect to FIG. 9 which has the same parts but is simply angularly shorter, the disc portion 300 comprises a cylinder-connecting portion 310 which has a shape of an arc of a circle to surround the cylinder 100 on an angular range, or angular coverage, $\Delta\theta_{AOC}$. In FIG. 4, which shows the side blades, i.e., the extremal disc portions 300 of the brush cutter rotor 10, this angular range $\Delta\theta_{AOC}$ is between about 181° and about 300°, preferably between 200° and 250°. The shape of an arc of a circle which forms the cylinder-connecting portion 310 ensures that the disc portion 300 is well seated onto the corresponding surface of the cylinder 100, at a given position on the length of the cylinder 100. The cylinder-connecting portion 310 has a radial height which is rather small as it does not reach the outside diameter D of the apparatus (i.e., diameter D of a toothless cutting tooth assembly 200) when viewed from aside (teeth excluded).

The disc portion 300 further comprises an incurved cutting-tooth-facing blade portion 320. This blade portion 320 is incurved, which means that there is a concavity when viewed from aside as in FIG. 4 or FIG. 9, and the concavity faces the cutting tooth assembly 320. The incurved cutting-tooth-facing blade portion 320 stems from the cylinder-connecting portion 310, and extends from the cylinder-connecting portion 310 both radially and angularly. It extends radially in that the incurved cutting-tooth-facing blade portion 320 has its outer edge 321 reach the outside diameter of the apparatus when viewed from aside (teeth excluded). It extends more radially in that the tip of the incurved cutting-tooth-facing blade portion 320 has a radial position which is closer to the corresponding cutting tooth assembly than the closest portion 311 of the cylinder-connecting portion 310 of the disc portion 300. The tip 322 marks the transition between the outer edge 321, which defined the diameter D of the toothless cutting tooth assembly 200, and the inner edge 323, which defines the incurved portion of the blade portion 320, which is an inward, corresponding tooth-oriented incurved portion, that is the concavity of the incurved portion is directed both toward an inward direction (toward an axial center of the cutting tooth assembly 200 onto which the disc portion 300 is secured and also toward the tooth assembly (for holding the removably secured cutting tooth) to which said disc portion 300 corresponds.

Figure 2:
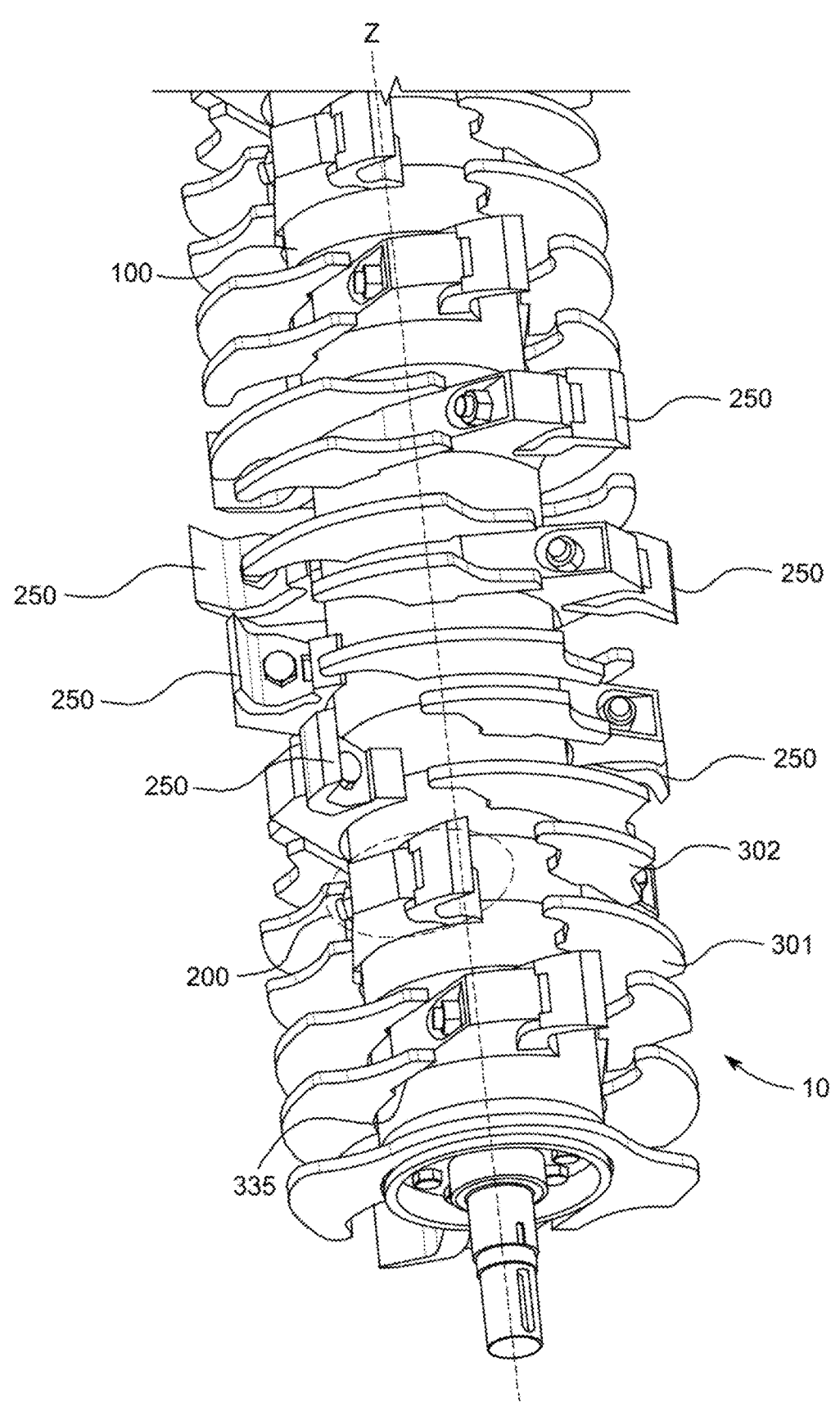
FIG. 2 is a close-up view of the brush cutter rotor of FIG. 1.

The disc portion 300 further comprises a disc base portion 330 which also reaches diameter D (outer edge 321). In the embodiment shown in FIG. 4, most representative of the disc portion 300 at the ends of the brush cutter rotor 10, this disc base portion 330 can reach the base 220 of the corresponding cutting tooth assembly 200. Its extremal end has its extremal edge 334 connect to a back portion of the base 220 of the corresponding cutting tooth assembly 200. It can be indented, as shown in FIG. 2, for example (where the indentation 335 relates to the embodiment of FIG. 9 where the disc portion 300 is supported by the adjacent cutting tooth assembly). The configuration of FIG. 4 can ensure that the disc portion 300 is well secured to the cutting tooth assembly 200, by being secured to its base 220. With the incurved cutting-tooth-facing blade portion 320 and the disc base portion 330, the overall (total) angular range $\Delta\theta_{tot}$ is between about 210° and about 330°, preferably between 270° and 310°, for the extremal disc portion 300 shown in FIG. 4.

For all other disc portions 300 which are within the brush cutter rotor and not at one of its two ends, FIG. 9 is more representative and shows that the disc portions 300 have a much smaller angular coverage in comparison with the extremal disc portion which is best shown in FIG. 3-5. In FIG. 9, the incurved cutting-tooth-facing blade portion 320, the base 330 and the cylinder-supporting portion 310 are integrated and form a piece which has its outer edge 321 reach the diameter D. Instead of starting from the base 220 of the corresponding cutting tooth assembly 200 and have the angular coverage described above to have the incurved cutting-tooth-facing blade portion 320 opposing the cutting tooth 250 of the same, corresponding incurved cutting-tooth-facing blade portion 320, the blade portion of a corresponding (or respective) cutting tooth assembly 200 has its base 330 start from the base 220 of an adjacent cutting tooth assembly 200 (i.e., the first left neighbor for the left disc portion 301 and the first right neighbor for the right disc portion 301 of a given cutting tooth assembly 200). Since the adjacent neighbor on either side is at an approximately opposite azimuthal position compared to the given cutting tooth assembly 200, the angular coverage $\Delta\theta_{AOC}$ of the cylinder-connecting portion 310 is smaller than the range described above of approximately 180° (same range applicable, minus 180°). This implies that, in this embodiment, the total angular coverage $\Delta\theta_{tot}$ also corresponds to the range described above (with respect to FIG. 4), minus 180°. In other words, the overall (total) angular range $\Delta\theta_{tot}$ of the disc portion 300 as shown in FIG. 9 (and which would correspond to the disc portions that are not extremal) is between about 30° and about 150°, preferably between 90° and 130°, preferably about 120°.

In the embodiment as shown, for example, in FIGS. 1-2 and 5, the disc portion 301 on the left and the disc portion 302 on the right of a given cutting tooth assembly have their tip portion 322 located at the exact same azimuthal position opposed to the corresponding cutting tooth. However, they have a different azimuthal coverage $\Delta\theta_{tot}$, where the difference is the angular offset $\Delta\theta_{n,n+2}$. This is because the disc portion 301 on the left is supported by the first neighbor on the left (azimuthally distant of 180° or 180°±$\Delta\theta_{n,n+2}$) and the disc portion 302 on the right is supported by the first neighbor on the right (azimuthally distant of 180°+$\Delta\theta_{n,n+2}$ or 180°, respectively), and these two different neighbors have an angular offset $\Delta\theta_{n,n+2}$ in between. A close inspection of FIG. 5 shows the different angular coverage of the two disc portions (301, 302) which belong to the same pair.

The base portion 330 stems from the cylinder-connecting portion 310, and extends from the cylinder-connecting portion 310 both radially and angularly. It extends radially in that the base portion 330 has its outer edge 331 reach the outside diameter of the apparatus when viewed from aside (teeth excluded). It extends more radially in that the extremal end has its extremal edge 334 connect to a back portion (the back 225) of the base 220 of the corresponding cutting tooth assembly 200 (FIG. 4) or of the adjacent cutting tooth assembly which is approximately azimuthally opposed, and which, in all cases, is angularly farther than the corresponding extremal portion 313 of the cylinder-connecting portion 310 of the disc portion 300.

As shown in FIG. 5, for example, the succession of disc portions 300 forms a quasi-surface around the brush cutter rotor 10. When the brush cutter rotor 10 rotates, the result is a larger cylinder of diameter D with protruding cutting teeth. It means that when the brush cutter rotor 10 is applied onto a large portion of material, such as a tree trunk or a tree stump, the largest diameter of the disc portions 300 serves as a guard to limit the quantity of incoming material which can penetrate in the area of action of the cutting teeth. For example, when in operation, the brush cutter rotor 10 can be applied onto a tree trunk and the brush cutter rotor 10 will penetrate into the tree trunk only by a limited distance defined by the distance between the protruding cutting edge of the cutting teeth and the largest diameter (D) of the disc portions, thereby limiting quantity to be treated by the cutting teeth in rotation to avoid large stresses.

However, the separating blades or disc portions 300 acting as a guard interspaced with the tracks of the cutting teeth are not to be confused with protection guards found in some apparatuses of the prior art wherein each is aligned at a center of the track axis of the corresponding cutting tooth. Such protection guards are provided facing the cutting teeth and not between adjacent tracks of the cutting teeth on the rotor as in the present embodiment. While, according to an embodiment, the separating blades or disc portions 300 are used as a comb on the rotor 10, with each separating blade being located between two adjacent tracks of cutting teeth and not facing any cutting tooth, prior art U.S. Pat. No. 6,764,035 B2 teaches a guard which corresponds to a single cutting tooth and which extends toward a central axis of that single cutting tooth. Therefore, the guard is facing a middle or central portion of the cutting tooth and serves as a protector. The embodiments of the present disclosure rather relate to separating blades not facing a central portion of the cutting tooth, rather located between the tracks of adjacent cutting teeth and protecting the edges thereof to direct incoming material to the central portion of any adjacent cutting tooth. The prior art U.S. Pat. No. 6,764,035 B2 does the contrary, i.e., the guard prevents the incoming material from hitting directly a central portion of the cutting tooth, but we have found that this puts much mechanical stress on the sides of each cutting tooth and induces premature damage to the cutting teeth and rotor in general.

According to an embodiment of the disclosure, the space in front of (or facing) a central portion of the cutting tooth 250 is free from (or exempt from) any blade, disc or other type of guard such that the incoming material is directly and unobstructively projected onto the central portion of the cutting tooth 250. Only edges thereof have a blade which serves as a comb to redirect the incoming material on either side thereof.

Also, as can be seen in FIG. 8, each neighboring cutting tooth has a certain width on the rotor, which defines a path or track for the angular rotation of the cutting tooth. The cutting tooth assembly 200 is installed on said track, that is there is a band (e.g., corresponding to the width won FIG. 8) on the contour of the cylinder which is dedicated to one cutting tooth assembly 200 to be installed thereon, at a given azimuthal position. The track also defined the path for the movement of rotation of the cutting tooth assembly when the brush cutter rotor 10 is in rotation (i.e., in operation). The tracks are sequentially provided on the brush cutter rotor 10. There is a space (spacing or gap in the longitudinal direction) between the neighboring cutting teeth of immediately adjacent tracks. The separating blades or disc portions 300 are located in that space or gap between immediately adjacent tracks, on each side of a given cutting tooth in that corresponding track, as shown in FIG. 8. Also, since the cutting tooth may have a slightly enlarging shape as it extends further away radially from the rotor 10 (and also radially away from the corresponding separating blades 301, 302), the side edges of the cutting portion of the cutting tooth 250 may be overlapping slightly in width with the corresponding pair of separating blades or disc portions 301, 302, as shown in the right cutting tooth of FIG. 8 (longitudinal overlap is shown). This overlap in width between a separating blade and an edge of a radially distal portion of a corresponding cutting tooth contributes to the protection of the side edges of the cutting tooth by the separating blade located there.

As shown in FIG. 2, and as already mentioned above, there are two blade portions (301, 302) on either side of a given cutting tooth assembly 200 and which correspond thereto, said two blade portions (301, 302) acting as separating blades for the incoming material to direct the incoming material frankly onto the corresponding cutting tooth assembly 200, or frankly out of its course (to the adjacent one to the right or to the left). This ensures that the incoming material is forwarded to the front of the cutting edge of the cutting tooth, and not on the sides of it (as in the prior art apparatuses having a protection blade centered in front of the tooth), where it would use the cutting tooth prematurely and introduce vibrations which would cause additional mechanical fatigue to the brush cutter rotor 10. Moreover, the quality of the cutting action is thereby improved (cutting performed at a faster rate or otherwise less power necessary to perform the action in the same time, cleaner surface on the adjacent uncut material, etc.).

Now turning back to the cutting tooth assembly 200, and referring to FIGS. 10-19, the cutting tooth assembly 200 comprises a base 220 (shown in FIGS. 10-12) acting as a holder to be secured onto the cylinder 100 for holding a removable cutting tooth 250 (shown in FIGS. 13-19). The cutting tooth 250 removably mounted and bolted onto the base 220 is also shown in FIG. 9, with the cutting tooth 250 installed in the holding portion of the base 220 and protruding both radially away and forwardly from the top of the holding portion of the base 220.

The base 220 comprises a body which is incurved on its bottom edge 223 to conform to the outward surface of the cylinder 100 onto which it is secured (same radius of curvature). The base 220 further comprises a front surface 221 for receiving the cutting tooth 250 to be held there. Since the cutting tooth 250 is preferably bolted, a bore 229 is provided to the body, and a rear surface is provided to screw a nut there to secure the whole cutting assembly 200 together (i.e., base 220 and tooth 250). The rear surface 222 is generally provided within the back 225 of the base 220. The back 225 is used to receive the corresponding pair of disc portions 301, 302, which connect there or which can abut onto the back 225.

As shown in FIGS. 8-9, in accordance with an embodiment of the present disclosure, the back 225 of a base 220 which secures a separating blade or disc portion 300 is not the base 200 of the cutting tooth 250 of which the edges are protected by this separating blade or disc portion 300. Instead, the separating blade or disc portion 300 which protects the edge of a given cutting tooth 250 is installed on the base 220 of the neighbor located in the immediately adjacent cutting tooth track, azimuthally opposed to that given cutting tooth 250. This contrasts with the prior art U.S. Pat. No. 6,764,035 B2 in which the protective guard of a central portion of a cutting tooth is secured to the base of that same cutting tooth, this prior-art configuration being ill-suited to the protection of the side edges of the cutting teeth as contemplated herein.

Figure 11:
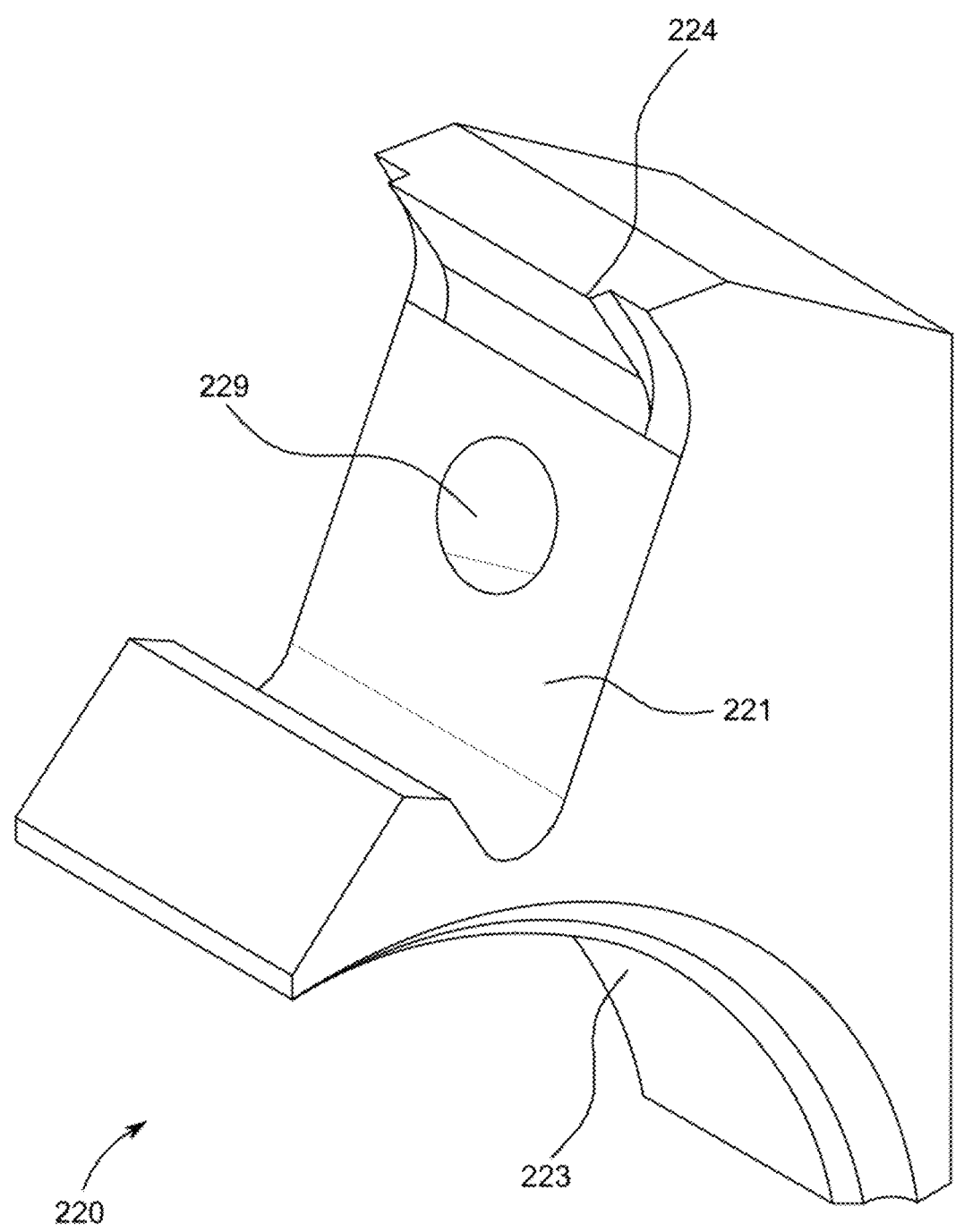
Figure 12:
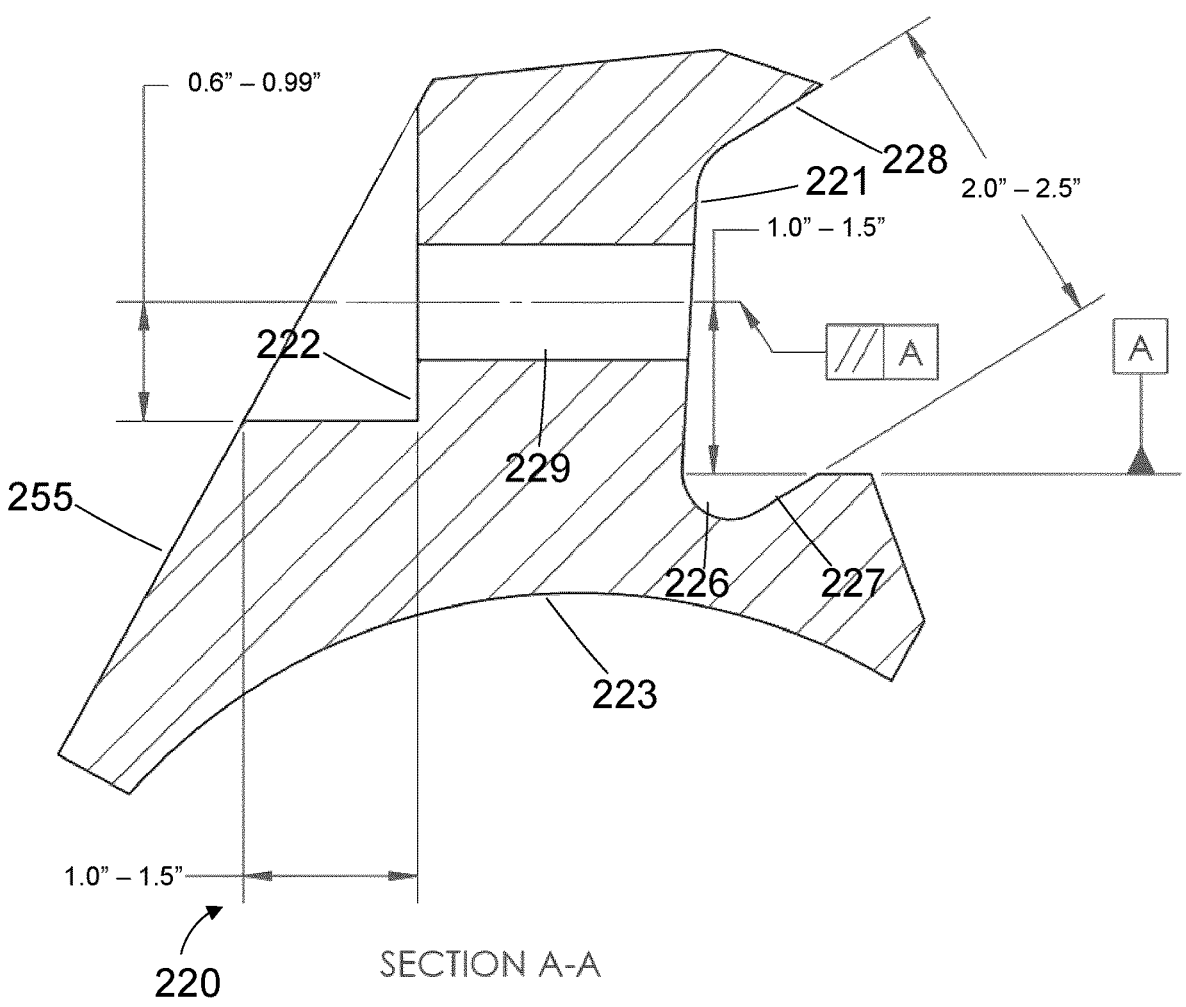
Figure 14:
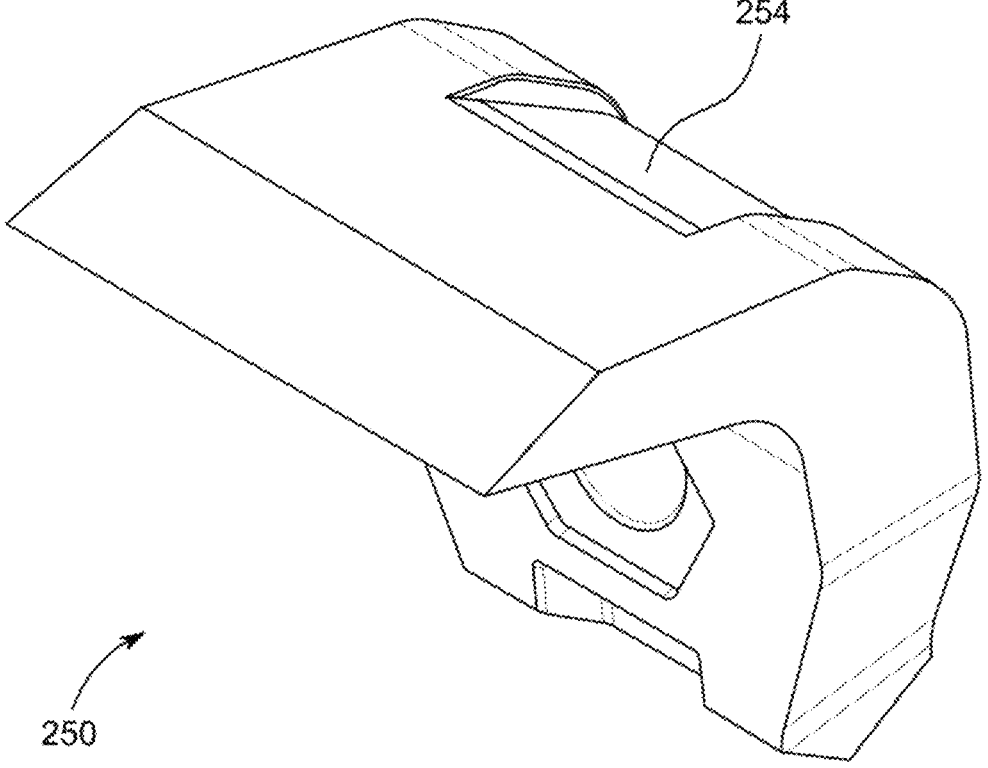

As well shown in FIG. 12, the base 200 has a holding portion which, in addition to the front surface 221, comprises a curved bottom 226, an opposed bottom slope 227 which is inclined upwardly and offers its surface toward the bore 229, opposed to the front surface 221. The holding portion of the base 220 also comprises an upper inclined wall 228 which is parallel or close to being parallel to the opposed bottom slope 227. The upper inclined wall 228 can comprise an indentation 224, as shown in FIG. 11, to match a corresponding indentation 254 in the tooth, as shown in FIG. 14.

According to an embodiment, and as shown in FIG. 12, the base 220 of a given cutting tooth assembly 200 has its rear surface 222 and front surface 221 for mounting not strictly parallel, i.e., they are both planar surfaces which extend not parallel but with a slight angular offset in between. According to an embodiment, this angular offset between the front and back of the base 220 (not to be confused with the pitch of the cutting teeth) is between 0.5° and 10°, preferably between 1° and 5°, more preferably between 2° and 4° for example about 3°.

The bore 229 through the body of the base 220 for the pin or screw is perpendicular to the rear surface 222. This means that the angular offset is maintained between the front surface 221 onto which the tooth is pressed and the nut 272 when the cutting tooth is bolted onto the front surface 221 for mounting said cutting tooth.

The tooth bore 259 is to be aligned with the bore 229 in the base 220 when the cutting tooth 250 is mounted onto the base 220. As shown in FIGS. 13-16, there is shown a nut receptacle 258 to receive a nut by which the cutting tooth 250 can be bolted to the base 220. The nut receptacle 258 has a shape of a nut and is a recess within the front surface of the cutting tooth, having also a planar surface within the recess, where the planar surface includes the angular offset (e.g., 3° as shown explicitly in FIG. 16) such that the pin or screw which traverses the bore 229 and the tooth bore 259 can be secured through the nut having the right orientation. This angular offset helps maintaining the front edge of the tooth slightly more toward the bottom. It increases the friction forces which hold in place the cutting tooth within the various surfaces of the holding portion of the base 220 (in addition to the fact that the cutting tooth 250 is bolted thereto). Mechanical fatigue on the cutting tooth assembly is thereby decreased.

Figure 13:
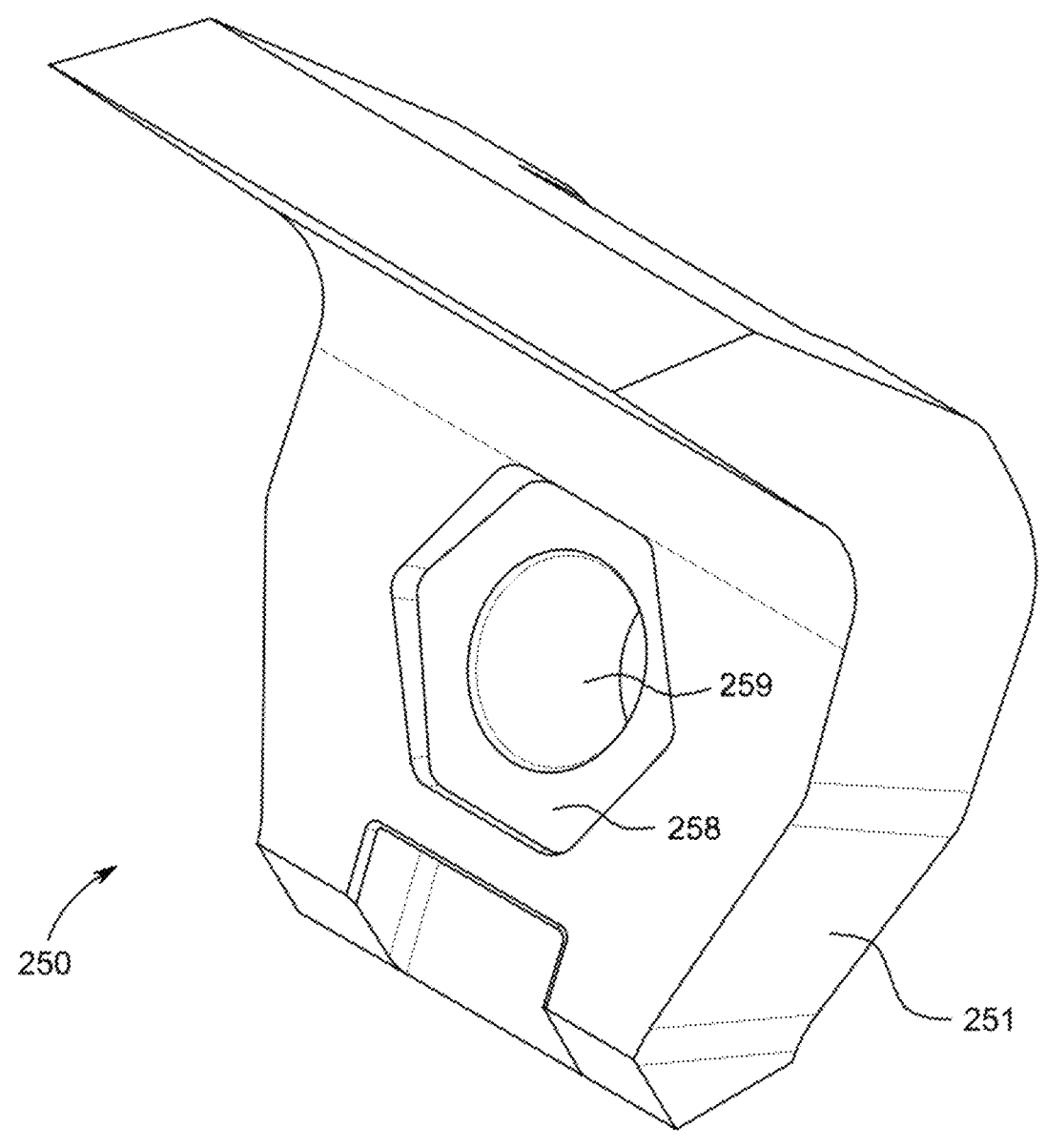
FIGS. 13-14 are two perspective views illustrating a cutting tooth, according to an embodiment of the invention.
Figure 15:
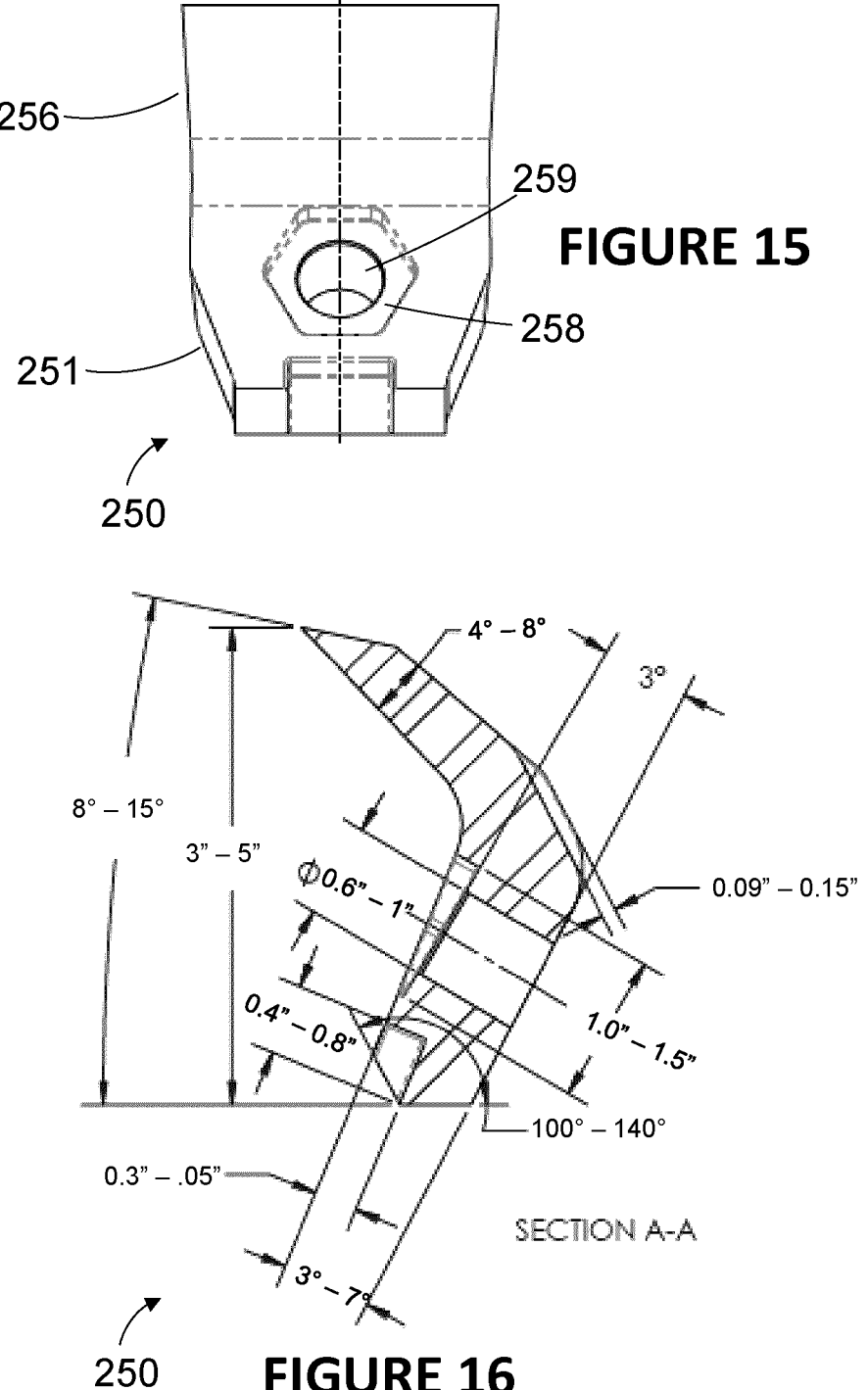

The cutting tooth is well shown in FIGS. 13-19. It comprises a tooth base 251 which substantially fits the bottom of the holding portion of the base 220, and which may be indented as shown in FIG. 13 or 15. The tooth base 251 may be narrower that the remainder of the cutting tooth 250. The cutting tooth 250 is made of a metal piece of varying width over its length which is then shaped to display an inner bending 252 on the inner (cutting) side (or front surface) of the cutting tooth 250, and a double bending on its outer surface, the first outer bending 253 corresponding (when the cutting tooth is in place in its base) to the transition between the front surface 221 and the upper inclined wall 228, and the second bending 254 being located on a portion of the cutting tooth which is above the holding portion of the base 220, as shown in FIG. 9. The cutting edge 255 forms the uppermost part of the cutting tooth. The cutting tooth can be divided into a tooth base 251 and a cutting portion 256, where the cutting portion 256 is the part which protrudes from the top of the holding portion of the base 220. Both portions (the tooth base 251 and the cutting portion 256) have approximately the same length.

FIGS. 12 and 15-19 illustrate appropriate measurements ranges for various portions of the base 220 (FIG. 12) and of the cutting tooth 250 (FIGS. 15-19).

Figures 17, 18:
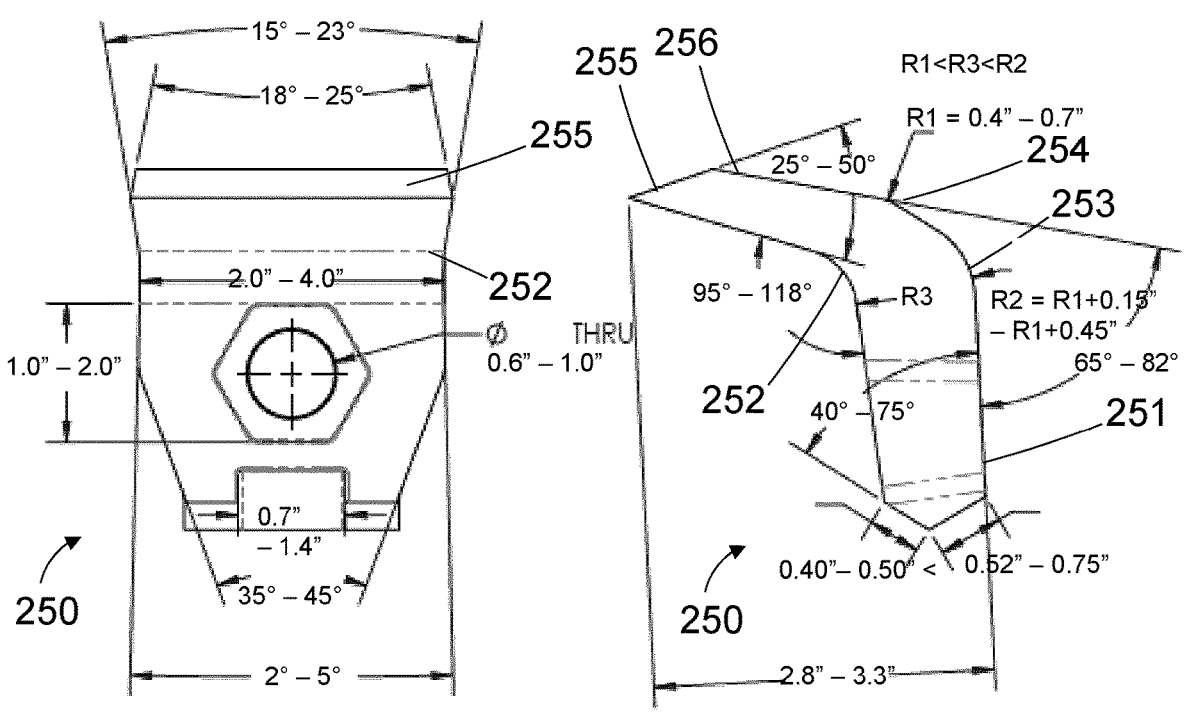
Figure 19:
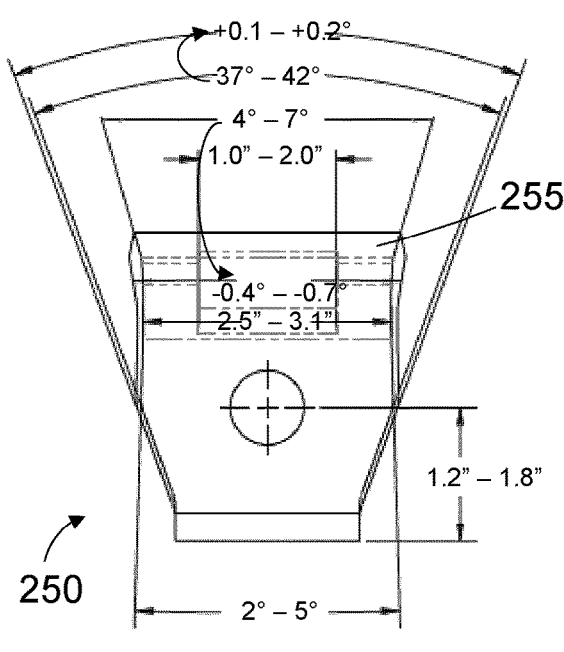

For example, FIG. 16 illustrates that the cutting portion 256 has a double upper surface (the upper surface comprises a proximal portion and a distal portion which is the upper surface of the cutting edge 255 which cuts) and a lower surface, and the proximal portion of the upper surface and the lower surface are not strictly parallel, but have an angular difference of the respective plane in which each surface extends which is between 4° and 8°. As shown in FIG. 18, the angle between the distal portion of the upper surface and the lower surface of the cutting tooth is between 25° and 50°, and preferably between 30° and 40°.

Still referring to FIG. 16, the bottom of the cutting tooth 250 can be horizontal, and the distal portion of the upper surface of the cutting portion 256 has an angular offset with the horizontal; between 8° and 15°, preferably between 10° and 13°. More specifically, the bottom of the cutting tooth 250 can be a double-sided bottom, one in the horizon and the other being angularly offset from the horizon between 100° and 140°, preferably between 110° and 125°. This other bottom surface (not horizontal) is angularly offset from the rear surface of the tooth base 251 between 40° and 75°, as shown in FIG. 18, and preferably between 50° and 60°.

The tooth base 251 has a front surface and a rear surface which, according to an embodiment, may not be parallel, and can have an angular offset of the plane in which each one extends between 3° and 7°, preferably between 4° and 6°.

As shown in FIG. 18, the lower surface of the cutting portion 256 forms an angle with the front surface of the tooth base 251, as formed by the inner bending 252, and this angle is between 95° and 118°, and it is preferably smaller than 120°. The inner bending 252 has a radius of curvature R3 which is greater than the radius of curvature R1 of the second bending 254 and smaller than the radius of curvature R2 of the first outer bending 253.

Still referring to FIG. 18, the rear surface of the tooth base 251 forms an angle with the proximal portion of the upper surface of the cutting portion 256 between 65° and 82°.

These measurements ensure that the cutting tooth 250 is well maintained in place within the base 220 and performs a good-quality cutting action.

Figure 20:
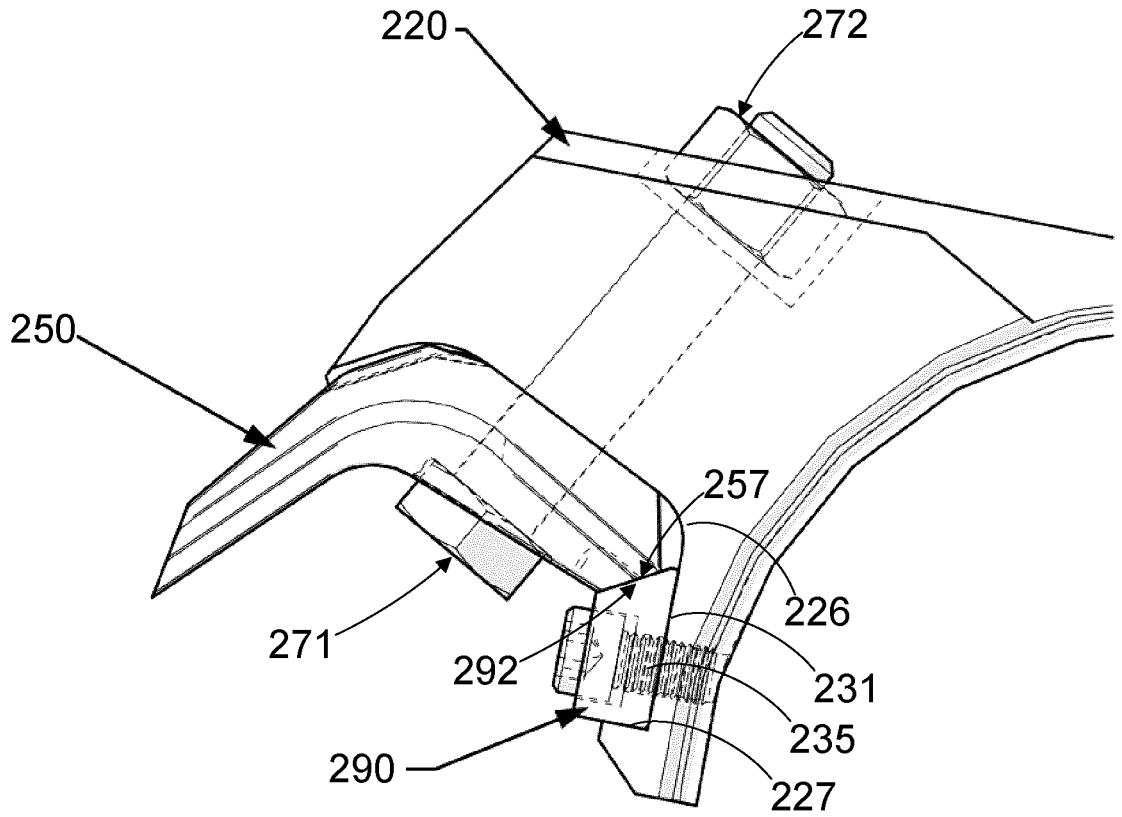
FIG. 20 is a side view illustrating a cutting tooth installed on a holder, according to an embodiment of the invention comprising a wear plate below the installed cutting tooth.

Now referring to FIGS. 20-21, there is shown an embodiment in which the cutting tooth 250 is installed in the holder base 220, including a wear plate 290. The wear plate 290 is a piece of solid material which is located below the cutting tooth 250 during installation and operation, and which undergoes significant forces during operation. Installing this wear plate 290 at this location ensures is beneficial to protect the contact portion of the holder 220. It can be replaced easily compared to the holder 220 that is expected to be welded onto the tube and to the discs. The wear plate 290 which can be made of a cheaper material and has a shape which is very easy to manufacture. Typically, it is made of a metal or alloy which wears faster than the metal or alloy used to make the holder 220 (or the cutting tooth), as it can be used to protect the surface of the holder which is in direct contact with the blade. Doing this may also reduce wearing of the cutting tooth 250 during operation. The wear plate 290 is a part which is disposable and replaceable by a new one periodically, for example it may sustain a few hundred or a few thousand hours of operation and then be replaced by a new one.

According to an embodiment, the tooth-receiving surface, or holding portion, of the holder base 220 is further elongated at a bottom portion thereof to accommodate this wear plate 290. For instance, the holding portion of the holder base 220 extends further from the curved bottom 226 in order to also receive, at this location, the wear plate 290. In comparison with the embodiment well shown in FIGS. 10 and 12, the base 200 has a holding portion which, stil comprises a curved bottom 226, and there is still also an opposed bottom slope 227 which is inclined upwardly and offers its surface toward the bore 229, opposed to the front surface 221, although this opposed bottom slope 227 does not retaining the cutting tooth 250 directly anymore, rather forming a distal portion of a seat for holding the wear plate 290. Between the curved bottom 226 and the opposed bottom slope 227, also forming a part of the seat for holding the wear plate 290, there is provided a wear-plate securing surface 231 on which the wear plate 290 is secured. For example, and as well shown in FIGS. 20-21, a bore can be provided through the body of the holder base 220 (body bore 233), and aligned with this body bore 233, through this wear-plate securing surface 291 (wear-plate bore 293). Accordingly, the wear plate 290 comprises a wear-plate bore 293 through its own body, which is to be aligned with the body bore 233 in the body of the holder base 220 through this wear-plate securing surface 231. Therefore, a screw (or pin, rod, etc.) 235 can be inserted through the aligned bores (233, 293) and secured therein (e.g., secured with a nut if a screw or other threaded element is used through the bores).

According to an embodiment of the present disclosure, the wear-plate bore 293 is threaded such that the screw 235 can be secured thereinto without the need for an opposed nut. Also according to an embodiment of the present disclosure, a ring or washer 236 can be provided between the screw 235 and the wear plate 290 to preserve their contact surfaces when being screwed together. According to an embodiment, the ring or washer 236, like the ring or washer 273, is a lock washer (such as a Nord-Lock™ washer) used to lock the screw to reduce the risk of loosening.

Together, the wear-plate securing surface 231 (which extends from the curved bottom 226 to the opposed bottom slope 227) and the opposed bottom slope 227 form a corner which receive a bottom portion of the wear plate 290 and thereby form a seat 237 onto which the wear plate 290 is firmly held, in addition to being bolted, screwed or otherwise secured to the wear-plate securing surface 291. As shown in FIG. 20, this corner can be substantially at a right angle.

As shown in FIG. 21, the wear plate 290 has, opposed to the corner, an inclined side surface 292. The inclined side surface 292 is in contact, such as in direct contact, with a bottom portion of the cutting tooth 250. For example, it can be in direct contact with the bottom portion 257 of the cutting tooth 250 that would otherwise have been in contact with the opposed bottom slope 227 of the embodiment shown in FIG. 10 or 12. Therefore, the wear plate 290, in an embodiment in which it is present, serves as an intermediate between the cutting tooth 250 and a bottom portion of the holding portion of the holder base 220 such as the opposed bottom slope 227, to absorb high forces that are present there during operation and contribute preferentially to the wear of the wear plate 290 instead of the holder 220 (and secondarily, instead of the cutting tooth 250). The cutting tooth 250 should have an inclined bottom surface which is to be parallel to the inclined side surface 292 of the wear plate, such that their corresponding surfaces interface well in a flat fashion for a proper distribution of the forces along this surface of contact between surfaces 257 and 292 these parts, as shown in FIG. 20.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A brush cutter rotor comprising:
a plurality of cutting teeth sequentially arranged along a longitudinal axis of the brush cutter rotor, and azimuthally offset from each adjacent one; and
separating blades provided in a pair on each side of a corresponding one of the plurality of cutting teeth and which extend radially about the brush cutter rotor to separate incoming material to a center of the corresponding one of the plurality of cutting teeth and away from side edges thereof,
wherein every second neighbor among the plurality of cutting teeth are arranged on the brush cutter rotor such that they together form a first spiral pattern, and every first neighbor of each of the plurality of cutting teeth of the first spiral pattern are arranged on the brush cutter rotor such that they together form a second spiral pattern substantially azimuthally opposed to the first spiral pattern, and
wherein each separating blade is a disc portion which starts from an adjacent one of the corresponding one of the plurality of cutting teeth and locally radially reaches a diameter D, and azimuthally extends along the brush cutter rotor while radially reaching less than the diameter D locally, and extends toward the corresponding one of the plurality of cutting teeth while radially reaching the diameter D again locally.

2. The brush cutter rotor of claim 1, wherein each one of the plurality of cutting teeth is azimuthally offset from an adjacent one by 180° or 180°±$\Delta\theta_{n,n+2}$, alternately, whereby each one of the plurality of cutting teeth is azimuthally offset from a second neighbor thereof by $\Delta\theta_{n,n+2}$, where $\Delta\theta_{n,n+2}$, is between 10° and 50°.

3. The brush cutter rotor of claim 1, wherein each separating blade is a disc portion which starts from an adjacent one of the corresponding one of the plurality of cutting teeth and azimuthally extends toward the corresponding one of the plurality of cutting teeth without reaching said corresponding one of the plurality of cutting teeth.

4. The brush cutter rotor of claim 3, wherein a portion of the disc portion which extends toward the corresponding one of the plurality of cutting teeth without reaching said corresponding one of the plurality of cutting teeth is incurved and forms a concavity which faces a cutting edge of the corresponding one of the plurality of cutting teeth.

5. The brush cutter rotor of claim 1, wherein each separating blade azimuthally extends on an angular range $\Delta\theta_{tot}$ between about 90° and about 130°.

6. The brush cutter rotor of claim 1, wherein the separating blades are non-extremal blades, further comprising extremal blades at sides of the brush cutter rotor which each separating blade azimuthally extends on an angular range $\Delta\theta_{tot}$ between about 270° and about 310°.

7. The brush cutter rotor of claim 1, wherein a central portion of each cutting tooth is facing a free space, exempt of any protecting guard extending there.

8. The brush cutter rotor of claim 7, further comprising cutting tooth assemblies installed on the cutter brush rotor, wherein each cutting tooth assembly comprises a holding base for receiving a corresponding cutting tooth therein.

9. The brush cutter rotor of claim 8, wherein the holding base for receiving a cutting tooth therein comprises a seat at a bottom of the holding base forming a corner, further comprising a wear plate to be installed in the corner of the seat, the cutting tooth being installed in the holding base over said wear plate, in contact with each other, the wear plate of a material different from a material of the cutting tooth.

10. The brush cutter rotor of claim 1, wherein cutting teeth are larger as they extend radially away from the brush cutter rotor and haves side edges thereof which each overlap along the longitudinal axis with a corresponding one of the separating blades.

11. A brush cutter rotor comprising:
a plurality of tracks for cutting tooth assemblies sequentially arranged along a longitudinal axis of the brush cutter rotor, wherein cutting tooth assemblies of immediately adjacent tracks are arranged to provide for a longitudinal gap in-between; and
separating blades provided along said longitudinal gap on each side of each track comprising one of the plurality of cutting tooth assemblies, and which extend radially about the brush cutter rotor to separate incoming material to a center of the corresponding one of the plurality of cutting tooth assemblies and away from side edges thereof,
wherein each cutting tooth assembly is arranged to be azimuthally offset from the cutting tooth assembly in the immediately adjacent tracks, wherein every second neighbor among the plurality of cutting tooth assemblies are arranged on the brush cutter rotor such that they together form a first spiral pattern, and every first neighbor of each of the plurality of cutting tooth assemblies of the first spiral pattern are arranged on the brush cutter rotor such that they together form a second spiral pattern substantially azimuthally opposed to the first spiral pattern, and
wherein each separating blade is a disc portion which starts from an adjacent one of the corresponding one of the plurality of cutting tooth assemblies and locally radially reaches a diameter D, and azimuthally extends along the brush cutter rotor while radially reaching less than the diameter D locally, and extends toward the corresponding one of the plurality of cutting tooth assemblies while radially reaching the diameter D again locally.

12. The brush cutter rotor of claim 11, wherein a central portion of each cutting tooth assembly is facing a free space, exempt of any protecting guard extending there.

13. The brush cutter rotor of claim 11, wherein each one of the plurality of cutting tooth assemblies is azimuthally offset from an adjacent one by 180° or 180°+$\Delta\theta_{n,n+2}$, alternately, whereby each one of the plurality of cutting tooth assemblies is azimuthally offset from a second neighbor thereof by $\Delta\theta_{n,n+2}$, where $\Delta\theta_{n,n+2}$, is between 10° and 50°.

14. The brush cutter rotor of claim 11, wherein each separating blade is a disc portion which starts from the cutting tooth assembly in one of the immediately adjacent tracks and azimuthally extends toward the corresponding one of the plurality of cutting tooth assemblies without reaching said corresponding one of the plurality of cutting tooth assemblies.

15. The brush cutter rotor of claim 14, wherein a portion of the disc portion which extends toward the corresponding one of the plurality of cutting tooth assemblies without reaching said corresponding one of the plurality of cutting tooth assemblies is incurved and forms a concavity which faces a cutting edge of the corresponding one of the plurality of cutting tooth assemblies.

16. The brush cutter rotor of claim 11, wherein each separating blade azimuthally extends on an angular range $\Delta\theta_{tot}$ between about 90° and about 130°.

17. The brush cutter rotor of claim 11, wherein the separating blades are non-extremal blades, further comprising extremal blades at sides of the brush cutter rotor which each separating blade azimuthally extends on an angular range $\Delta\theta_{tot}$ between about 270° and about 310°.

18. The brush cutter rotor of claim 11, wherein each cutting tooth assembly comprises a holding base for receiving a cutting tooth therein.

19. The brush cutter rotor of claim 18, wherein the holding base for receiving a cutting tooth therein comprises a seat at a bottom of the holding base forming a corner, further comprising a wear plate to be installed in the corner of the seat, the cutting tooth being installed in the holding base over said wear plate, in contact with each other.

20. The brush cutter rotor of claim 19, wherein the cutting tooth and the wear plate is each distinctly screwed or bolted through the holding body with a distinct screw or bolt, respectively.

21. The brush cutter rotor of claim 18, wherein each cutting tooth is larger as it extends radially away from the brush cutter rotor and has side edges thereof which each overlap along the longitudinal axis with a corresponding one of the separating blades.

\*    \*    \*    \*    \*